United States Patent [19]

Nishikawa et al.

[11] Patent Number: 5,907,375
[45] Date of Patent: May 25, 1999

[54] INPUT-OUTPUT UNIT

[75] Inventors: Eiji Nishikawa; Tsunemasa Mita; Masaaki Araki; Kazuhiro Suzuki; Kazuyoshi Itoh; Toshikazu Minomoto, all of Ebina, Japan

[73] Assignee: Fuji Xerox Co., Ltd., Tokyo, Japan

[21] Appl. No.: 08/807,952

[22] Filed: Feb. 28, 1997

[30] Foreign Application Priority Data

Mar. 1, 1996 [JP] Japan ........................... 8-44405
Feb. 28, 1997 [JP] Japan ........................... 9-45428

[51] Int. Cl.⁶ ................... G02F 1/1333; G02F 1/1335; G09G 5/00
[52] U.S. Cl. ..................... 349/12; 349/122; 345/173
[58] Field of Search ................... 349/12, 96, 122, 349/23

[56] References Cited

U.S. PATENT DOCUMENTS

| | | | |
|---|---|---|---|
| 4,143,103 | 3/1979 | Sheridon | 264/4 |
| 4,398,804 | 8/1983 | Yokoi | 349/96 |
| 4,527,862 | 7/1985 | Arakawa | 349/12 |
| 4,723,836 | 2/1988 | Kono et al. | 349/12 |
| 5,623,280 | 4/1997 | Arkins et al. | 349/12 |

FOREIGN PATENT DOCUMENTS

| | | |
|---|---|---|
| 62-139025 U | 9/1987 | Japan . |
| A-63-247819 | 10/1988 | Japan . |
| 3-124542 U | 12/1991 | Japan . |
| A-5-61061 | 3/1993 | Japan . |
| A-5-273531 | 10/1993 | Japan . |
| A-6-75210 | 3/1994 | Japan . |
| A-6-75213 | 3/1994 | Japan . |
| A-6-75701 | 3/1994 | Japan . |
| A-6-332602 | 12/1994 | Japan . |
| A-6-337411 | 12/1994 | Japan . |
| A-7-114010 | 5/1995 | Japan . |
| A-7-209635 | 8/1995 | Japan . |
| A-8-44405 | 2/1996 | Japan . |
| B2-2530651 | 6/1996 | Japan . |
| A-8-241647 | 9/1996 | Japan . |
| B2-2556711 | 9/1996 | Japan . |
| A-8-258147 | 10/1996 | Japan . |
| A-8-315668 | 11/1996 | Japan . |
| A-8-327975 | 12/1996 | Japan . |

*Primary Examiner*—Hung Xuan Dang
*Assistant Examiner*—Dung Nguyen
*Attorney, Agent, or Firm*—Oliff & Berridge, PLC

[57] ABSTRACT

An input-output unit includes a display unit having a bendable display screen for displaying information on the bendable display screen; and a pressure-sensitive input unit containing detection means being provided below the display screen for detecting a position on the bendable display screen in response to press pressure from a view side of the bendable display screen.

15 Claims, 18 Drawing Sheets

FIG.1
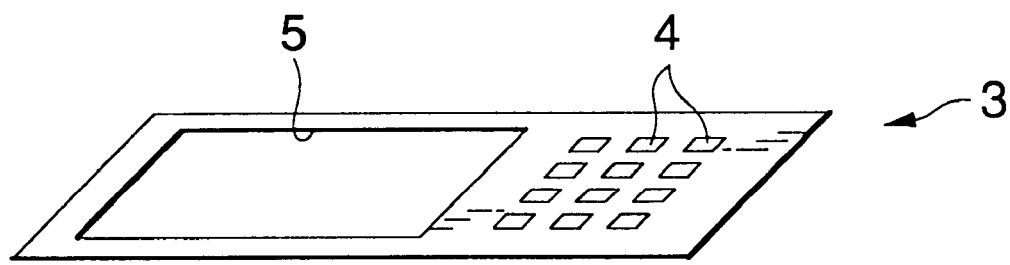
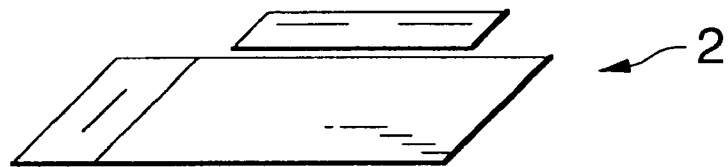
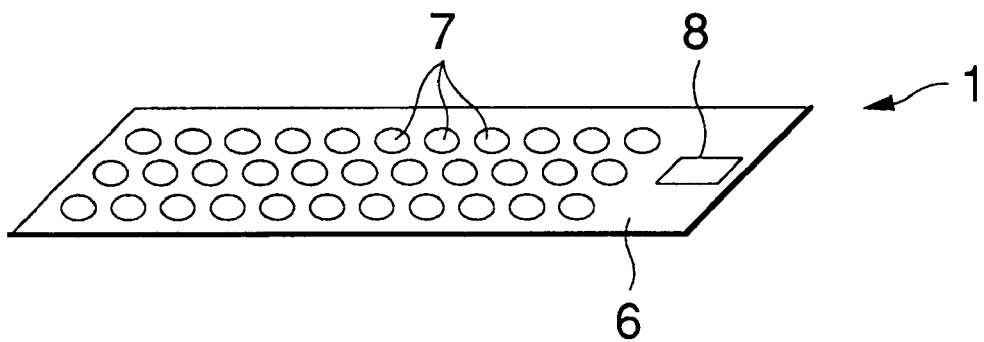

LOCALLY CARVED

DISPLACEMENT AMOUNT

SPACER : 0.04mm

BLACK PORTIONS INDICATE REACTED POSITIONS

SPACER : 0.1mm

BLACK PORTIONS INDICATE REACTED PORTIONS

INPUT-OUTPUT UNIT

BACKGROUND OF THE INVENTION

1. Field of the Invention

This invention relates to an input-output unit comprising a liquid crystal display panel, EL, etc., (user interface unit) widely used with office automation machines such as copies, facsimiles, and printers and electronic machines such as personal computers, wordprocessors, handy terminals, and portable information communication machines.

2. Description of the Related Art

Known as a conventional input-output unit used for a control panel, etc., of an office automation machine such as a copier or facsimile or an electronic machine is a unit comprising an information input display of a liquid crystal display screen, etc., for displaying operation information of the machine and virtual operation buttons responsive to the operation information and enabling the operator to enter control information such as function selection or specification of the number of copies in the machine by pressing any of the virtual operation buttons.

Techniques related to such an input-output unit are already proposed, for example, as disclosed in Japanese Utility Model Laid-Open Nos. Sho 62-139025 and Hei 3-124542, Japanese Patent Laid-Open Nos. Hei 6-332602 and Sho 63-247819, etc.

Operation panel switches according to Japanese Utility Model Laid-Open No. Sho 62-139025 are operation panel switches for producing multiple display and are membrane switches having transparent electrodes placed on the top face of a dot matrix liquid crystal display device.

A switch mechanism using a liquid crystal display panel according to Japanese Utility Model Laid-Open No. Hei 3-124542 for controlling various functions of an electronic machine comprises a liquid crystal display panel for displaying symbols representing various functions of an electronic machine, a memory section for storing symbols displayed on a number of screens, a transparent pressure-sensing sensor being disposed on the front of the liquid crystal panel and switched to a function responsive to a displayed symbol group, an interface section for switching the function of the pressure-sensing sensor, and a backlight for illuminating the liquid crystal display panel from the rear.

Further, an information processing system according to Japanese Patent Laid-Open No. Hei 6-332602 comprises a liquid crystal display for displaying various pieces of information, a pressure-sensitive touch panel placed on the front of the liquid crystal display, a software keyboard being displayed on the liquid crystal display whenever necessary for receiving the coordinate position entered on the display from the pressure-sensitive touch panel, and a keyboard input auxiliary section being placed on or removed from the software keyboard and provided on the top face with projections like key buttons matched with the key layout of the software keyboard, characters matched with the key character layout of the software keyboard being displayed on the surfaces of the projections by printing, etc.

On the other hand, a touch panel input-output unit according to Japanese Patent Laid-Open No. Sho 63-247919 comprises a display unit having a display screen as a set of a large number of character areas and digital touch switches like a matrix superposed on the screen with the size of one partition area for sensing one coordinate position almost equaling the partition of the character area and the display pitch of the character areas of the display unit almost equaling the detection pitch of the partition areas of the digital switches, wherein the partition areas of the digital switches are placed on the character areas of the display unit in offset overlapped relation of ½ pitch in X and Y directions.

FIG. 24 is an exploded view to show a specific structure of a control panel of a conventional copier in various proposed techniques as described above. In such a conventional structure, an information input display consists of a translucent liquid crystal display screen 21 formed by bonding plate glasses and a touch panel 22 superposed on the display screen 21, and a panel board 24 having an opening 23 covers the information input display. The touch panel 22 is provided by forming a transparent conductive thin film matrix of ITO, etc., at predetermined pitches (for example, 4-mm pitches) on two glass substrates and then bonding the glass substrates with a slight gap between. When any position on the touch panel 22 is pressed, opposed conductive thin films are brought into local contact with each other by the press pressure, producing electric conduction. Then, a CPU circuit 25 determines the press position on the touch panel 22 based on a level change of an output signal. In FIG. 27, numeral 26 is a fluorescent lamp for illuminating the liquid crystal display screen 21 from behind, numeral 27 is a light diffusion board for diffusing illumination light of the fluorescent lamp 26 onto the full face of the liquid crystal display screen 21, and numeral 28 is an inverter circuit for turning on the fluorescent lamp 26.

In such a conventional information input display, if virtual operation buttons responsive to the available functions of the machine are displayed on the liquid crystal display screen 21 and the user Is made to press the operation buttons, the user presses any of the operation buttons. Thus, whether or not one of the virtual operation button is pressed can be checked from the relationship between the press position on the touch panel 22 and the display position of the virtual operation button. Therefore, in a conventional control panel having the information input display, the display contents of the liquid crystal display screen 21 are changed for each use function, whereby more than one function can be assigned to one virtual operation button, so that the number of physical operation buttons provided on the control panel can be decreased markedly.

However, since the touch panel is placed on the front of the liquid crystal display screen in the conventional information input display, contrast of the display screen lowers and the display contents are hard to see. To consider easy-to-see display contents, the liquid crystal display screen is made translucent as described above and a backlight must be provided on the rear side of the display screen.

Since the touch panel and liquid crystal display screen use glass substrates, if the user strongly presses the touch panel in such a situation that the sensitivity of the touch panel worsens, it is also feared that the glass substrates may be broken under press pressure.

On the other hand, if operation buttons frequently used like ten digit keys for entering the number of copies are displayed as virtual operation buttons on the information input display, the appearance of the control panel is uncluttered, but it is feared that operability will worsen. Thus, as shown in FIG. 24, in the conventional control panel, operation buttons 29 such as ten-digit keys frequently used are provided separately from the information input display and of course, a switch matrix board 31 on which input switches 30 are placed is disposed below the operation buttons 29. Since the switch matrix board 31 and the touch panel 22 are disposed side by side, if they can be formed in one piece, assembling the control panel is facilitated and lowering the manufacturing cost can also be expected.

Although input switches 30 of any structure may be placed on the matrix switch board 31 covered by the panel board 24 if they can convert press pressure of the operation buttons into an electric signal, there is a restriction that the touch panel must be transparent. If the control panel is manufactured with both the switch matrix board 31 and the touch panel 22 formed in one piece, the manufacturing cost increases.

To protect liquid crystal panels from press pressure, the inventor et al. examined techniques of combining a liquid crystal panel and a cushioning material and have found that a large number of patent applications were conducted as disclosed in Japanese Patent Laid-Open Nos. Hei 7-114010, Hei 6-75210, Hei 6-75213, Hei 6-75701, Hei 8-327975, Hei 6-337411, Hei 7-209635, etc.

A liquid crystal display unit according to Japanese Patent Laid-Open No. Hei 7-114010 comprises a liquid crystal display section having a liquid crystal display device, a light transmission section being disposed on the display side of the liquid crystal display section for transmitting light, and a shock-absorption section being placed between the light transmission section and the liquid crystal display section and made of a material having a refractive index closer to the refractive index of the light transmission section than that of air and having flexibility to the degree that it can substantially absorb deformation of the light transmission section.

Techniques for liquid crystal display units and manufacturing methods therefor are proposed in Japanese Patent Laid-Open Nos. Hei 6-75210, Hei 6-75213, Hei 6-75701, Hei 8-327975, etc.

Among them, the liquid crystal display unit according to Japanese Patent Laid-Open No. Hei 6-75213 comprises a liquid crystal display panel provided with a tablet board for enabling handwritten input, wherein the liquid crystal display panel and a transparent protection board on the view side of the display panel are bonded with a transparent viscous adhesive resin having a cushioning property and wherein the refractive index difference between the bond layer and the bonded members is 0.2 or less.

The liquid crystal display unit according to Japanese Patent Laid-Open No. Hei 8-327975 comprises a tablet board brought into intimate contact with the view side of a liquid crystal display panel via a weakly adhesive, transparent resin sheet having a cushioning property.

Further, in a light dispersion prevention structure and a manufacturing method therefor in a liquid crystal display unit according to Japanese Patent Laid-Open No. Hei 6-337411 comprising liquid crystal cells, a shock absorption layer being formed on the liquid crystal cell surface side, and a protection panel separated by the shock absorption layer from the liquid crystal cells with a gap of a given thickness between, the shock absorption layer is formed of a light dispersion prevention material and is bonded intimately to the liquid crystal cells and the protection panel in deaeration relation.

Further, in a light dispersion prevention structure and a manufacturing method therefor in a liquid crystal display unit according to Japanese Patent Laid-Open No. Hei 7-209635 comprising liquid crystal cells, a shock absorption layer being formed on the liquid crystal cell surface side, and a protection panel separated by the shock absorption layer from the liquid crystal cells with a gap of a given thickness between, the shock absorption layer is formed of a light dispersion prevention material and is bonded intimately to the liquid crystal cells and the protection panel in a sealed condition in deaeration relation and the protection panel is made of a synthetic resin with a hard layer at least on the surface.

However, in the techniques, if the cushioning material is inserted between the liquid crystal display panel and the polarizing panel and moreover the liquid crystal display panel and the polarizing panel are supported on the surroundings, an air layer exists between the liquid crystal display panel and the polarizing panel and light incident from the top of the polarizing panel is fully reflected in the gap between the liquid crystal display panel and the polarizing panel because of the refractive index difference between the polarizing plate and air, making the liquid crystal display panel poor in viewability. That is, a new problem arises.

In every technique proposed, the input switches are placed on the top of the liquid crystal display panel. Thus, the following problems remain unsolved: The input switches placed on the top cause the display screen contrast to lower, making the display contents hard to view, and the liquid crystal display screen must be made translucent and a backlight must be provided on the rear side to consider the easiness to read the display contents. Since the touch panel and the liquid crystal display screen use glass substrates, if the user strongly presses the touch panel in such a situation that the viewability of the touch panel worsens, it is feared that the glass substrates may be broken under press pressure even if the shock absorbing layer is provided; the problem also remains unsolved.

SUMMARY OF THE INVENTION

The invention has been made to eliminate the above problems, and therefore a first object of the invention is to provide an input-output unit that can provide excellent viewability of operation information and virtual operation buttons displayed on an information input display, can be free of the fear of breakage when the information input display is operated, and can be manufactured at low costs.

A second object of the invention is to provide an input-output unit that can reliably prevent liquid crystal orientation destruction, etc., caused when a display unit such as an image display panel is pressed, and can also reliably perform the input operation of an input unit if the image display panel such as a liquid crystal display panel is placed on the top of a pressure-sensitive input unit of switch devices, etc., for making display on the display screen of the image display panel easy to see and providing excellent viewability of images displayed on the display screen.

In order to solve the above problems, according to a first aspect of the invention, there is provided an input-output unit comprising a display unit for displaying information on a bondable display screen and a pressure-sensitive input unit containing means being provided below the display screen for detecting a position on the display screen In response to press pressure from a view side of the display screen.

In a second aspect of the invention, in the input-output unit of the first aspect of the invention, the display screen and the detection means therebelow are like a sheet.

In a third aspect of the invention, in the input-output unit of the first aspect, the display screen contains any of a liquid crystal display panel, an electroluminescence panel, or a twisting ball panel display. For, example, the twisting ball panel display comprises a large number of minute spheres each with a half colored black dispersed in liquid for inverting an image and displaying the resulting image by rotating the minute spheres by an electric field or a magnetic field, as disclosed in U.S. Pat. No. 4,143,103.

In the first to third aspects of the invention, the detection means is provided below the display screen, whereby the display unit and the input unit are formed in one piece, thus if the user presses the view side of the display screen with a finger or a pen in response to the display contents of the display screen (for example, virtual buttons), the detection means can detect the press position on the display screen for input, providing very good operability. For example, if the detection unit is within the display area of the virtual buttons, the input operation of pressing the virtual button is performed. Further, the detection means of the input unit is provided below the display screen, so that a display obstacle such as a touch panel does not exist on the display screen. Thus, very good viewability is provided, and no back-light, etc., is required with the results that the display unit can be made simple in structure and inexpensive in costs. In addition, unlike the touch panel on the display screen, the detection means need not be made transparent. The material and manufacturing method are less limited as compared with the touch panel on the display screen, thus an input device can be manufactured at very low costs. If sheet-like devices are used as the display screen and the detection means therebelow, they can be made light and provide good space efficiency, thus can be applied to portable electronic machines. If the input-output unit to which the invention is applied is applied to electronic machines, the electronic machines can be made light.

According to a fourth aspect of the invention, there is provided an input-output unit comprising an information input display for displaying various pieces of operation information of an electronic machine and virtual operation buttons corresponding to the operation information on a display screen and enabling a user to enter control information of the electronic machine by pressing the virtual operation buttons, characterized in that the information input display comprises a bendable sheet-like display screen superposed on a switch matrix board on which a plurality of input switches are placed at predetermined pitches.

According to the control panel of the invention thus configured, a bendable sheet screen is used as the information display screen for displaying operation information and virtual operation buttons of the office automation machine, thus if the information display screen is superposed on the switch matrix board, the input switches placed on the switch matrix board can be indirectly pressed by pressing the information display screen.

Since the invention eliminates the need for providing a touch panel on the information display screen, the user can directly view the information display screen and recognize the operation information and virtual operation buttons displayed on the screen more clearly than was previously possible. In addition, a backlight for enhancing viewability need not be provided on the rear side of the information display screen either and the manufacturing costs can also be reduced.

Since a glass substrate need not be used for the information display screen or the switch matrix board, it is not feared that the glass substrate may be broken when the virtual operation button is operated.

Acccording to a fifth aspect of the invention, there is provided an input-output unit comprising a bendable image display panel having an image display device and means being laminated below the image display panel for sensing coordinates of a position pressed from a view side of the image display panel.

In a sixth aspect of the invention, in the input-output unit of the fifth aspect, the image display panel is formed of a bendable liquid crystal display panel containing liquid crystal display elements, and the coordinate sensing means is so arranged as to detect the coordinates of a position of the liquid crystal display panel which is pushed from the view side thereof.

In the fifth and sixth aspects of the invention, the input-output unit comprises the bendable image display panel having an image display device such as a liquid crystal display device and the means being laminated below the image display panel for sensing the coordinates of a position pressed from the view side of the image display panel, thus the image display panel is placed on the surface side of the input-output unit, so that an input-output unit excellent in viewability and operability can be provided.

In a seventh aspect of the invention, the input-output unit of the sixth aspect comprises a shock absorption layer having elasticity for dispersing a local stress from the view side of the liquid crystal display panel on a view side of the liquid crystal display device layer and transferring the dispersed stress to the coordinate sensing means.

In the seventh aspect of the invention, the input-output unit provides a shock absorption layer having elasticity for dispersing a local stress from the view side of the liquid crystal display panel on the view side of the liquid crystal display device layer and transferring the dispersed stress to the coordinate sensing means, thus press pressure acting on the liquid crystal display device can be absorbed on the shock absorption layer having flexibility and orientation destruction of the liquid crystal display device can be reliably prevented. In addition, the stress appropriately dispersed to the coordinate sensing means can be transmitted to othe coordinate sensing means, thereby being capable of increasing the protection of the display unit from an external force and the certainty of input.

In an eighth aspect of the invention, in the input-output unit of the seventh aspect, the liquid crystal display panel has a pair of polarizing plates at a position where the liquid crystal display device is interposed between the polarizing plates, and a shock absorption layer having flexibility is placed between the liquid crystal display device and a polarizing plate positioned on the view side of the liquid crystal display device and a refractive index of the shock absorption layer is set to a value closer to a refractive index of material forming the liquid crystal display device and the polarizing plate than a refractive index of air.

In the eighth aspect of the invention, the shock absorption layer having flexibility is placed between the liquid crystal display device and the polarizing plate positioned on the view side of the liquid crystal display device and the refractive index of the shock absorption layer is set to a value closer to the refractive index of material forming the liquid crystal display device and the polarizing plate than the refractive index of air, thus if a shock absorption layer having flexibility is placed between the liquid crystal display device and the polarizing plate positioned on the view side of the liquid crystal display device for preventing orientation destruction of the liquid crystal display device, the refractive index of the shock absorption layer is set to a value close to that of material forming the liquid crystal display device and the polarizing plate, so that the shock absorption layer can be prevented from lowering viewability.

In a ninth aspect of the invention, in the input-output unit of the seventh aspect, the liquid crystal display panel has a pair of polarizing plates at a position where the liquid crystal display device is interposed between the polarizing plates, and a shock absorption layer having flexibility is placed between the liquid crystal display device and a polarizing plate positioned on the view side of the liquid crystal display device and a reinforcing plate for protecting the liquid crystal display device is placed below the shock absorption layer.

In the ninth aspect of the invention, the shock absorption layer having flexibility is placed between the liquid crystal display device and the polarizing plate positioned on the view side of the liquid crystal display device and the reinforcing plate for protecting the liquid crystal display device is placed below the shock absorption layer, thus the liquid crystal display device can be reliably protected by means of the reinforcing plate and orientation destruction of the liquid crystal display device can be prevented furthermore reliably.

In a tenth aspect of the invention, in the input-output unit of the ninth aspect, a shock absorption layer having flexibility is placed between the liquid crystal display device and a polarizing plate positioned on the view side of the liquid crystal display device and a reinforcing plate for protecting the liquid crystal display device and widening a range in which the coordinate sensing means receives pressure is placed below the liquid crystal display device.

In the tenth aspect of the invention, the shock absorption layer having flexibility is placed between the liquid crystal display device and the polarizing plate positioned on the view side of the liquid crystal display device and the reinforcing plate for protecting the liquid crystal display device and widening the range in which the reinforcing plate receives pressure to a desired range is placed below the liquid crystal display device, thus the liquid crystal display device can be reliably protected by means of the reinforcing plate and the range in which the coordinate sensing means receives pressure can be widened by means of the reinforcing plate, so that press pressure from the view side of the liquid crystal display device is transferred to the coordinate sensing means reliably in a wide range and the resolution of the coordinate sensing means can be enhanced.

In an eleventh aspect of the invention, in the input-output unit of the tenth aspect, the elastic moduli of the shock absorption layer, the liquid crystal display device, and the reinforcing plate are set so as to satisfy the relation of reinforcing plate>liquid crystal display device>shock absorption layer.

In a twelfth aspect of the invention, in the input-output unit of the seventh to eleventh aspects, the shock absorption layer is made of a gel resin material or a rubber resin material.

In a thirteenth aspect of the invention, in the input-output unit of the fifth to tenth aspects, the coordinate sensing means is made of membrane switches.

BRIEF DESCRIPTION OF THE DRAWINGS

In the accompanying drawings

FIG. 1 is an exploded perspective view to show an example of an input-output unit of the invention;

DETAILED DESCRIPTION OF THE PREFERRED EMBODIMENTS

Figure 2:
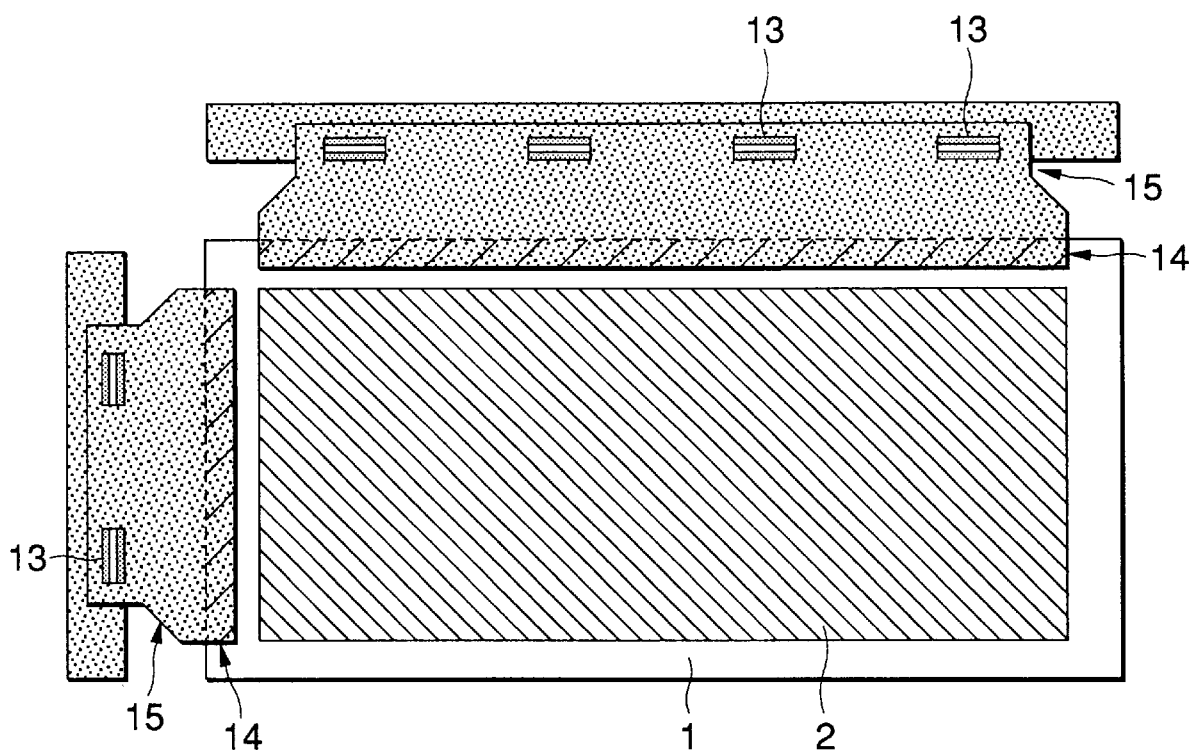
FIG. 2 is a plan view to show an example of the input-output unit of the invention.

Referring now to the accompanying drawings, there are shown preferred embodiments of the invention.

Embodiment 1

FIG. 1 is an exploded perspective view to show a first embodiment of a control panel of a copier to which the invention is applied. In the figure, numeral 1 is a switch matrix board on which a plurality of input switches are placed, numeral 2 is an information display screen superposed on the switch matrix board 1, and numeral 3 is a panel comprising a ten-key numerical pad 4 and a window 5 corresponding to the information display screen 2.

Figure 3:
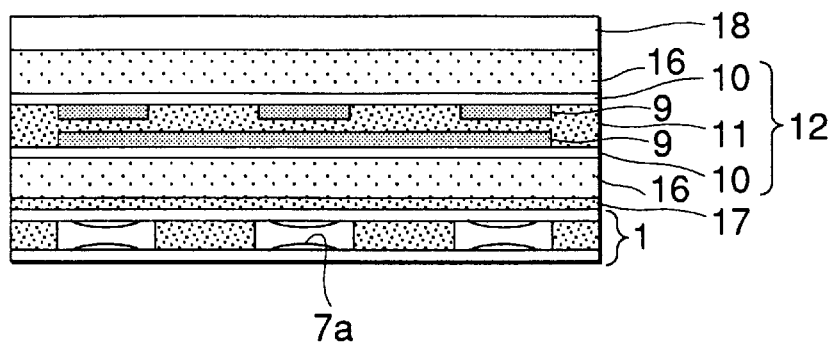
FIG. 3 is a perspective view of the main part to show an example of the input-output unit of the invention.

First, the information display screen 2, which is a reflection-type liquid crystal display screen, is formed like a flexible sheet. For the liquid crystal display screen 2, as shown in FIG. 3, ferroelectric liquid crystal is applied to each of a pair of transparent resin sheets 10 and 10 on which ITOs (indium tin oxides) 9 serving as electrodes are evaporated, then they are bonded to each other, forming a liquid crystal sheet 12, and further an STN liquid crystal driver IC 13 for applying a predetermined drive voltage to the electrode 9 is bonded by thermocompression to the transparent resin sheet 10, 10 by an anisotropic conductive adhesive sheet 14, forming a TCP (tape carrier package) 15, as shown in FIG. 2. To enhance contrast of the display screen, the liquid crystal sheet 12 is sandwiched between resin polarizing plates 16 and 16 and an aluminum reflection film 17 50 μm thick is bonded to the opposed face to the switch matrix board 1. Further, to prevent a local stress from acting on liquid crystal 11 contained in the liquid crystal sheet 12, the top face of the liquid crystal display screen 2 is coated with a resin film 18 about 0.2 mm thick, serving as a cushioning material.

On the other hand, the switch matrix board 1 comprises a plurality of separate input switches 7 placed like a matrix on a membrane board. The input switches 7 are formed by matrix-wiring of key electrodes made of steel on the membrane board 6. A CPU circuit 8 for sensing electric conduction at each input switch 7 is provided on the membrane board 6. Further, to produce a sense of operation when the input keys 7 are pressed, the part of each input switch 7 corresponding to the key electrode is provided with a plate spring 7a like a as shown in FIG. 3, for producing adequate resistance to press pressure.

In the embodiment, the liquid crystal display screen 2 is superposed on the switch matrix board 1 thus configured; since the liquid crystal display screen 2 is formed like a flexible sheet as described above, a part of the liquid crystal display screen 2 is directly pressed, whereby the corresponding input switch 7 on the switch matrix board 1 can be pressed. Therefore, if the user presses a virtual operation button displayed on the liquid crystal display screen 2, the input switch 7 corresponding to the virtual operation button below the screen 2 is pressed and the CPU circuit 8 determines the pressed input switch 7, whereby whether or not the virtual operation button is operated can be determined.

On the other hand, in the embodiment, the input switches 7 placed on the switch matrix board 1 are placed below not only the liquid crystal display screen 2, but also the ten-key numerical pad 4 disposed on the panel 3. That is, the input switches electrically conducting when the ten-key numerical pad 4 is pressed and the input switches electrically conducting when the virtual operation buttons are pressed are placed on one membrane board 6.

Therefore, in the embodiment, one matrix switch board 1 can bear both virtual operation button input and ten-key numerical pad input, and the manufacturing coat can be decreased as compared with the conventional control panel requiring that the switch matrix board corresponding to the ten-key numerical pad be provided apart from the touch panel.

Although the input switches placed on the switch matrix board 1 are membrane switches in the embodiment, any devices can be used as switches if they can convert pressure of the virtual operation button pressed by the user into on/off of an electric signal. The layout of the switches is not limited to a matrix and may be any layout and the number thereof may be one or more.

Embodiment 2

Figure 4:
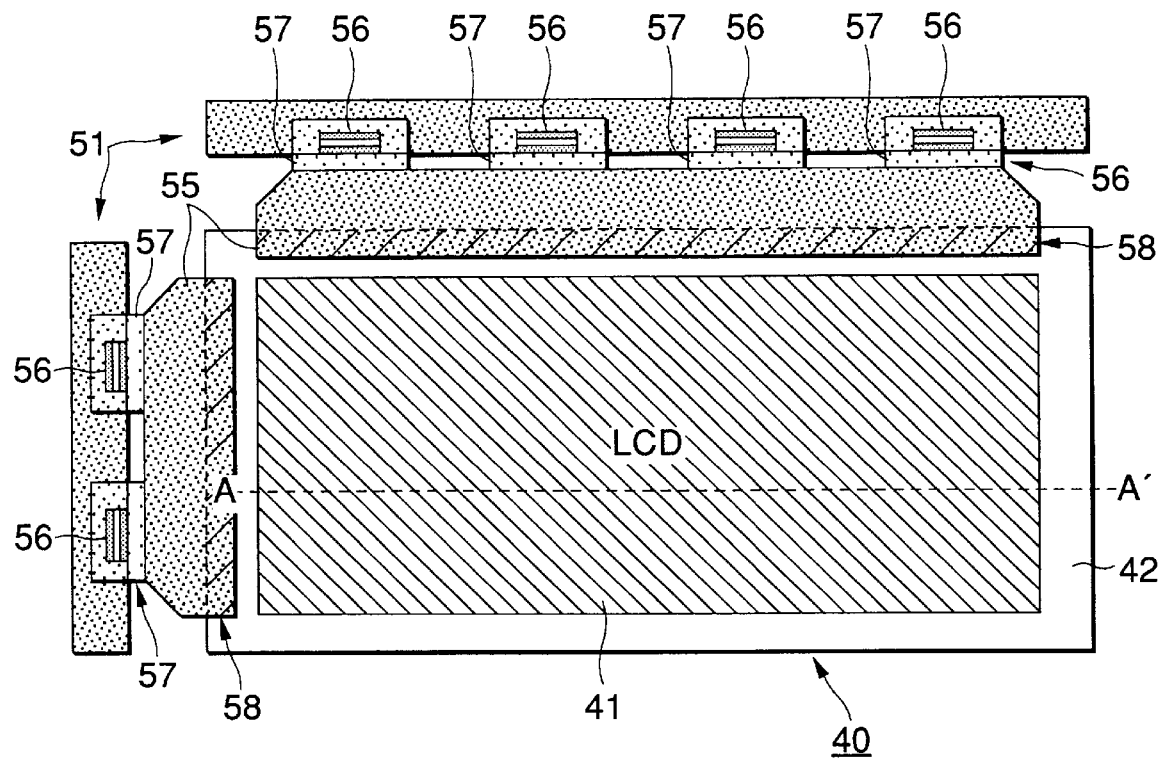
FIG. 4 is a plan view to show an input-output unit according to a second embodiment of the invention.
Figure 5:
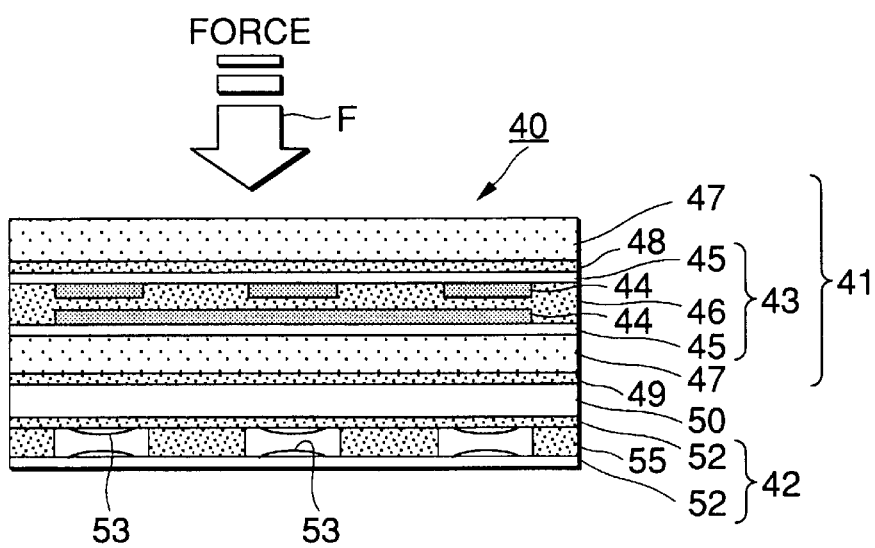
FIG. 5 is a perspective view of the main part along line A—A of FIG. 4 to show the input-output unit according to the second embodiment of the invention.

A second embodiment of the invention shows an enhancement example of protection of a display unit against an external force and input reliability of an input unit as compared with the first embodiment of the invention. FIGS. 4 and 5 are a plan view and a sectional view to show an input-output unit through which information can be input according to the second embodiment of the invention.

An input-output unit 40 according to the second embodiment of the invention is roughly divided into a liquid crystal display panel 41 for displaying various screens in response to the functions of a machine to which the input-output unit 40 is applied and membrane switches 42 placed below the liquid crystal display panel 41, as shown in FIG. 5.

The liquid crystal display panel 41, is made of a reflection-type liquid crystal display panel 41 and is formed like a flexible sheet. The liquid crystal display panel 41 comprises a polarizing plate 47 placed on both the surface and rear sides of a liquid crystal display section 43; the polarizing plates 47 need not directly be laminated on the liquid crystal section 43 and any other layer or plate member may be inserted between the polarizing plate 47 and the liquid crystal display section 43. The liquid crystal display section 43 of the liquid crystal display panel 41 comprises liquid crystal 46 laminated between PES (polyethersulfon) sheets 45 and 45 on which ITO electrodes 44 of transparent electrodes are evaporated linearly at predetermined pitches, as shown in FIG. 5. The polarizing plate 47 is placed on the outside of the PES sheet 45. The ITO electrodes 44 evaporated on a pair of the PES sheets 45 and 45 are placed linearly at predetermined pitches so as to cross each other; the upper and lower electrodes 44, 44, . . . form a matrix. Further, for example, ferroelectric polymeric liquid crystal is used as the liquid crystal 46 laminated between the PES sheets 45 and 45, but the liquid crystal 46 is not limited to it and any other type of liquid crystal may be used, of course.

For example, a liquid display section whose basic configuration and operation are as disclosed in U.S. Pat. No. 2,512,290, etc., is used as the liquid display section 43 of the liquid crystal display panel 41; more particularly, a liquid display section configured as disclosed in Japanese Patent Laid-Open Nos. Hei 5-61061, 5-273531, etc., according to applications of Idemitu Kousan Kabushikikaisha can be used. For example, the liquid display section 43 of the liquid crystal display panel 41 is manufactured as follows: A film of liquid crystal 46 made of ferroelectric polymeric liquid crystal, etc., is applied to one or both of PES sheets 45 and 45 on which ITO electrodes 44, 44 of transparent electrodes are evaporated and the opposed PES sheets 45 and 45 are laminated, then they are passed through a plurality of rollers, thereby applying orientation treatment by bending. The liquid crystal display panel 41 using the liquid crystal 46 made of ferroelectric polymeric liquid crystal has a memory property and thus has a feature of being capable of holding a display screen even when voltage application is stopped.

A shock absorption layer 48 made of a viewability enhancement sheet for preventing irregular reflection, etc., and enhancing the viewability of the liquid crystal display panel 41 is laminated between the PES sheet 45 and polarizing plate 47 on the surface of the liquid crystal display panel 41, namely, the view side thereof. For example, a layer made of a gel resin or rubber resin is used as the shock absorption layer 48 made of the viewability enhancement sheet. The polarizing plate 47 is laminated on the surface of the shock absorption layer 48 made of the viewability enhancement sheet to produce light and shade of a display image based on change in optical anisotropy of liquid crystal to which an electric field is applied. At the time, if the shock absorption layer 48 placed between the bendable liquid crystal display section 43 and the polarizing plate 47 differs from other members largely in refractive index, it cause reflection of external light and the display quality of the liquid crystal display panel 41 worsens. Thus, it is most suitable to use a gel resin or rubber resin having a refractive index of about 1.4 to form the transparent shock absorption layer 48 made of the viewability enhancement sheet because synthetic resin forming the ferroelectric liquid crystal 46, polarizing plate 47, etc., has a refractive index of about 1.4 while the refractive index of air is 1.0.

For example, a viewability enhancement sheet 400 μm thick having adhesion manufactured by Nitto Denko is used as the shock absorption layer 48 because it has a refractive index of 1.46. The viewability enhancement sheet 48 is placed between the liquid crystal display panel 41 and the polarizing plate 47 in a state in which it is held owing to its own adhesion. For example, the viewability enhancement sheet used as the shock absorption layer 48 is made of a gel resin such as an acrylic family polymer or a rubber resin such as a silicone family resin polymer.

A polarizing plate 47 is laminated on the rear side of the liquid crystal display section 43 with no intervention of any member; it is placed so as to cross the polarizing plate 47 on the surface side of the liquid crystal display panel 41. Further, a reflection plate 49 for reflecting light incident from the surface side of the liquid crystal display panel 41 is laminated below the polarizing plate 47 on the rear side of the liquid crystal display panel 41. For example, aluminum foil, etc., is used as the reflection plate 49. Further, a reinforcing plate 50 for reinforcement against press pressure of the liquid crystal display panel 41 and improving the resolution of the membrane switches 42 (described later) is laminated below the reflection plate 49. For example, an acrylic plate, plastic plate, etc., is used as the reinforcing plate 50.

Figure 6:
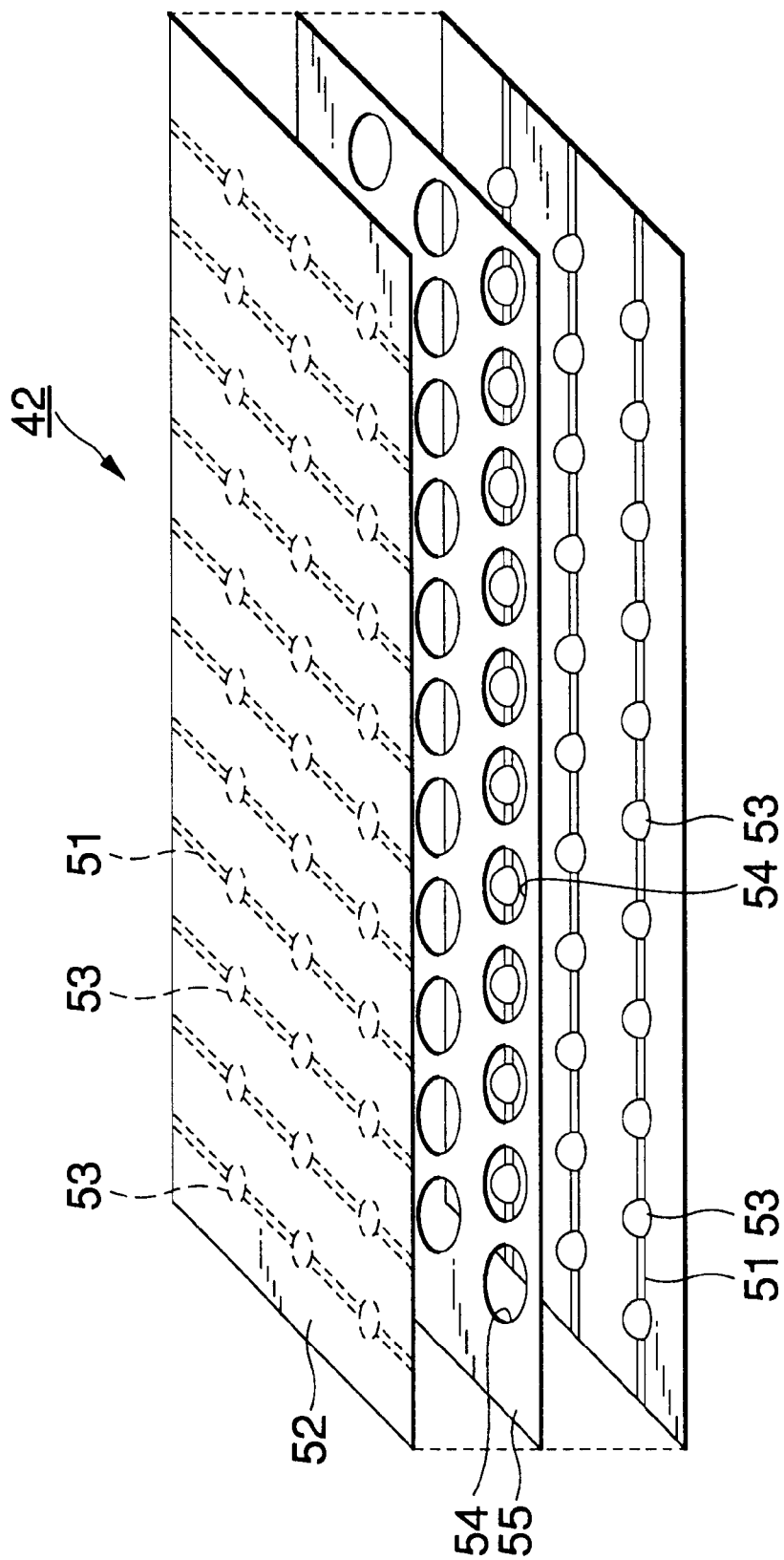
FIG. 6 is an exploded perspective view to show membrane switches.

Further, the membrane switches 42 as coordinate sensing means for sensing the coordinates of a press position with a finger, a pen, etc., from the surface side of the liquid crystal display panel 41 are placed on the rear side of the reinforcing plate 50. As shown in FIG. 6, the membrane switches 42 are made up of a pair of switch sheets 52 and 52 having matrix-like electrode patterns 51 at predetermined pitches along the vertical and horizontal directions and a spacer sheet 55 placed between the switch sheets 52 and 52 and having areas 54 corresponding to switch parts 53 of the electrode pattern 51 broken like circles or rectangles. The areas of the switch sheets 52 and 52 corresponding to the press position with a finger, etc., bend and the corresponding switch parts 53 formed on the switch sheets 52 and 52 come in contact with each other, whereby the coordinates of the press position are sensed (Japanese Patent No. 2556711).

However, the membrane switches 42 are not limited to them. Various types of membrane switches disclosed in Japanese Patent Laid-Open Nos. Hei 8-315668, Hei 8-258147, Hei 8-241647, Japanese Patent No. 2530651, etc., can be used; any types of membrane switches can be used.

In addition, the following analog membrane switches may be used as membrane switches 42: Placed between conductive substrates each formed like a rectangle is a resistance layer formed like the same shape and grid electrodes for detection are disposed on the vertical and horizontal ends of the conductive substrates, whereby when parts of the conductive substrates are pressed, a resistance value between the detection grid electrodes disposed on the vertical and horizontal ends changes and thus is detected for sensing the coordinates of the press position with a finger, etc. The membrane switches are not limited to the analog type and may be of any type if they can be responsive to press pressure from the view side of the display screen for detecting a position on the display screen.

FIG. 4 shows wiring between the input-output unit configured as described above and a control board.

In FIG. 4, numeral 41 is liquid crystal display panel and membrane switches 42 are placed below the liquid crystal display panel 41 in lamination relation. For wiring of the liquid crystal display panel 41, an STN liquid crystal driver IC 56 for applying a predetermined drive voltage via a bendable board 55 to ITO electrodes 44 of the liquid crystal display panel 41 is connected to a TCP (tape carrier package) 57 and electrodes 44 of a transparent resin sheet 45 of the liquid crystal display panel 41 is bonded by thermocompression by an anisotropic conductive adhesive sheet 58. The TCP 57 is connected to a printed board 59.

Figure 7:
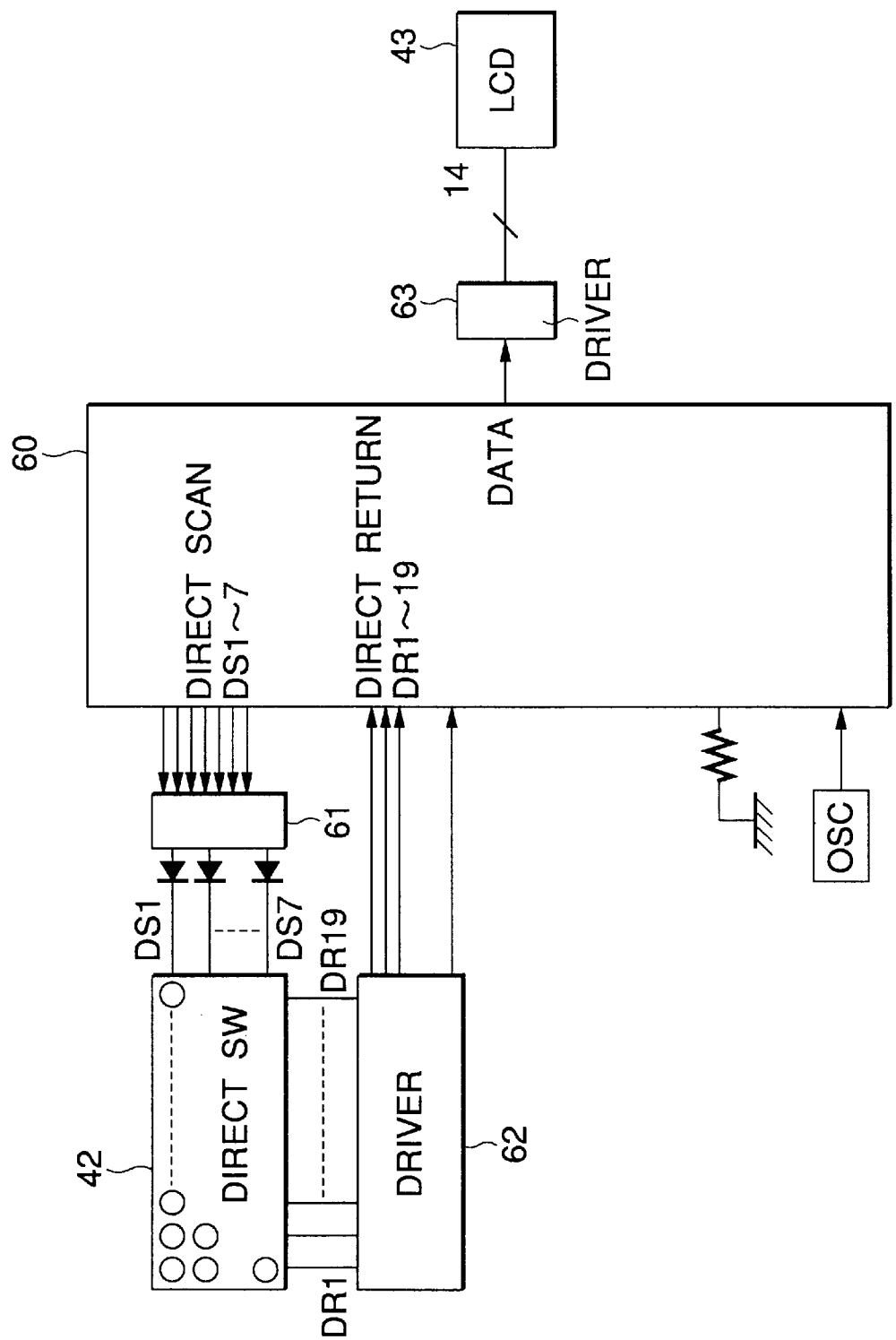
FIG. 7 is a block diagram to show a control circuit.

FIG. 7 is a block diagram to show a control circuit of the input-output unit 40 configured as described above.

In FIG. 7, numeral 60 is a CPU for controlling the input-output unit 40. The matrix-like membrane switches 42 of the input-output unit 40 are configured as follows: The electrode pattern 51 of electrodes placed at predetermined pitches along either of the X and Y directions is scanned by scan output produced via a buffer circuit 61 from the CPU 60 and an output signal from the electrode pattern 51 of electrodes placed at predetermined pitches along the other direction is input via a driver circuit 62 to the CPU 60, which then detects the coordinates of a press position with a finger, etc., from the view side of the liquid crystal display panel 41.

Figure 8:
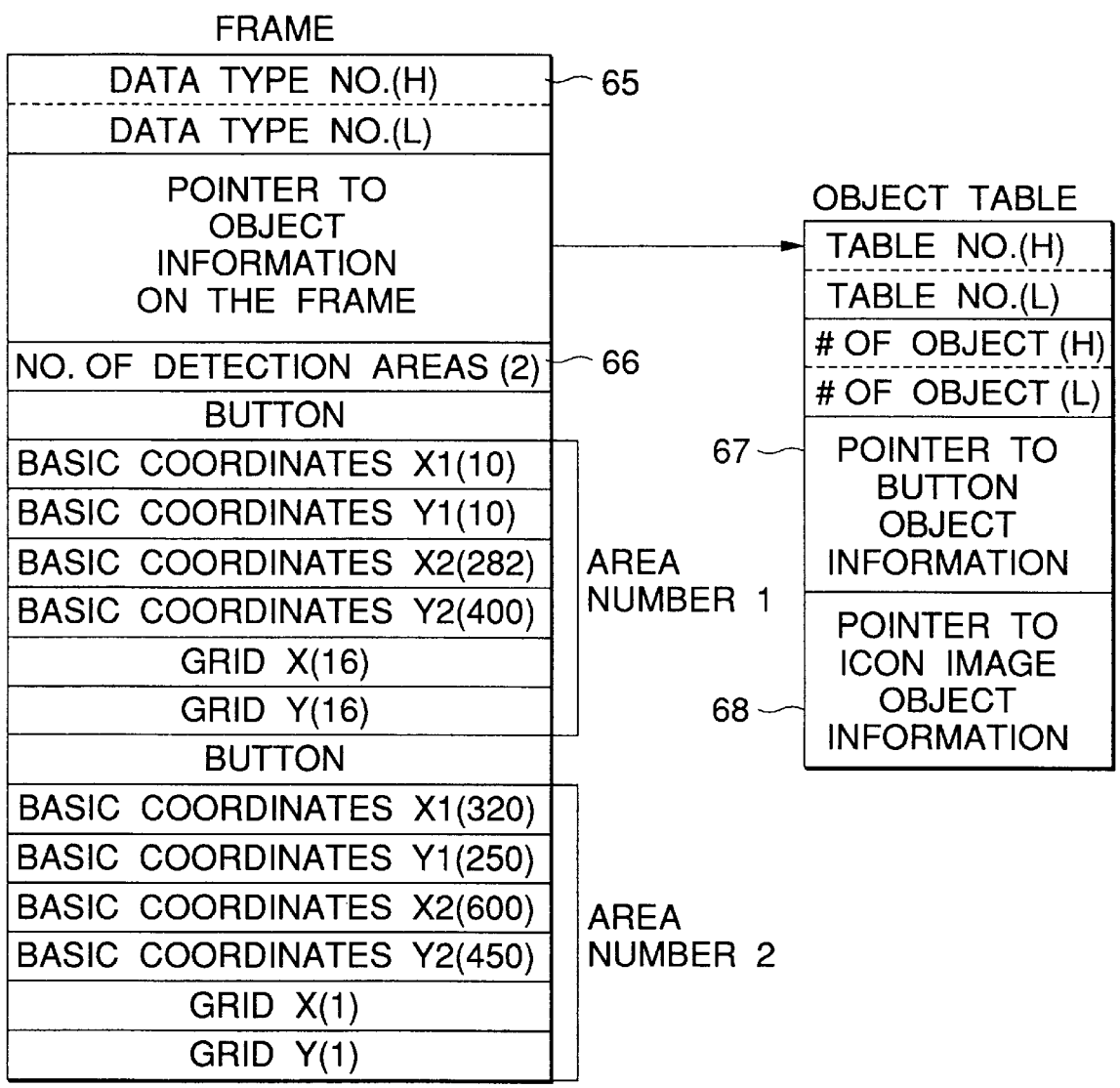
FIG. 8 is a chart to show an example of frame data for displaying images on a liquid crystal display panel.

The CPU 60 displays a display screen based on input information on the liquid display section 43 of the liquid crystal display panel 41. That is, the CPU 60 performs drawing processing on the liquid display section 43 via the driver circuit 63 based on configuration data of the displayed screen, which will be hereinafter called frame data. For example, as shown in FIG. 8, the frame data for displaying a screen on the liquid display section 43 includes display information (for drawing) 65 of display indicating areas of virtual buttons, etc., and objects such as icon images displayed on the frame and detection area information 66 for specifying the range of a touch area for inputting by pressing a predetermined area. Further, as shown in FIG. 8, the object display information (for drawing) 65 comprises an object table functioning as a pointer 67 to button object information for specifying display of coordinates, light and shade, etc., and a pointer 68 to icon image object information for specifying display of coordinates, light and shade, etc.

Figure 9:
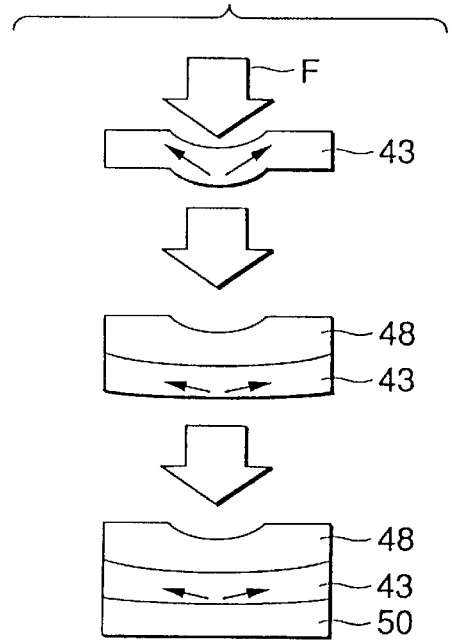
FIG. 9 is a schematic diagram to show how a liquid crystal display section is deformed.

In the configuration, the input-output unit according to the embodiment can provide excellent viewability of operation information and virtual operation buttons displayed on the information input display, can be free of the fear of breakage when the information input display is operated, and can be manufactured at low costs as described below. If the liquid crystal display panel is made easy to see and the viewability of images displayed on the liquid crystal display panel is made excellent by placing the liquid crystal display panel above the switch devices, etc., the input-output unit according to the embodiment can reliably prevent liquid crystal orientation destruction, etc., caused when the liquid crystal display panel is pressed, and can also reliably perform the operation of the switch devices, etc., as follows:

The input-output unit according to the embodiment comprises the shock absorption layer 48 made of the viewability enhancement sheet placed on the top of the bendable liquid crystal display panel 41 as shown in FIG. 5. For example, a layer made of a gel resin or rubber resin is used as the shock absorption layer 48 made of the viewability enhancement sheet. Thus, press pressure F applied from above the polarizing plate 47 positioned on the surface of the input-output unit 40 propagates to the shock absorption layer 48 made of a gel resin or rubber resin placed below the polarizing plate 47, deforming the shock absorption layer 48 for absorbing the press pressure F, as shown in FIG. 9. Therefore, the shock absorption layer 48 absorbs the press pressure F applied from the surface of the input-output unit 40, whereby the press pressure F acts on the liquid crystal display section 43 in a state in which it is weakened, and thus orientation destruction of the liquid crystal 46, etc., can be reliably prevented.

The press pressure F is applied from above the polarizing plate 47 positioned on the side of the viewability enhancement sheet 48 on the bendable liquid crystal display section 43, whereby a force acts on the liquid crystal display section 43 through the shock absorption layer 48. However, the press pressure F applied from the polarizing plate 47 on the surface of the input-output unit 40 is dispersed and absorbed on the shock absorption layer 48, as shown in FIG. 9, so that the force F applied to the liquid crystal display panel 41 does not locally concentrate and moderately propagates to the liquid crystal 46 with the press pressure F application point as the center. Thus, the press pressure F applied from above the polarizing plate 47 is dispersed and absorbed on the shock absorption layer 48 and only causes the bendable liquid crystal display panel 41 to be moderately deformed.

Further, the reinforcing plate 50 is placed below the polarizing plate 47 and the reflection plate 49 positioned below the bendable liquid crystal display panel 41. The reinforcing plate 50 placed below the bendable liquid crystal display panel 41 serves in protection of the bendable liquid crystal display panel 41 and improvement in the input reliability and the resolution of the membrane switches 42 positioned below the liquid crystal display panel 41.

In contrast, if the shock absorption layer 48 does not exist on the surface side of the liquid crystal display section 43 and only the liquid crystal display section 43 exists, as shown in FIG. 9, the press pressure F applied from above is applied to the bendable liquid crystal display panel 41 intact, destructing the orientation of the liquid crystal 46. On the other hand, if the shock absorption layer 48 is provided on the surface side of the liquid crystal display section 43, the press pressure F applied from above is absorbed on the shock absorption layer 48 for dispersing the locally concentrating force. Thus, the local stress applied to the liquid crystal display section 43 changes to a stress distribution having a large curvature as a whole. Further, the reinforcing plate 50 is placed below the liquid crystal display section 43, whereby the local stress changing to a stress distribution having a large curvature in the presence of the shock absorption layer 48 is restored to a state close to a plane and an orientation shift in the liquid crystal causing orientation destruction of the liquid crystal 46 can be minimized.

Figure 10:
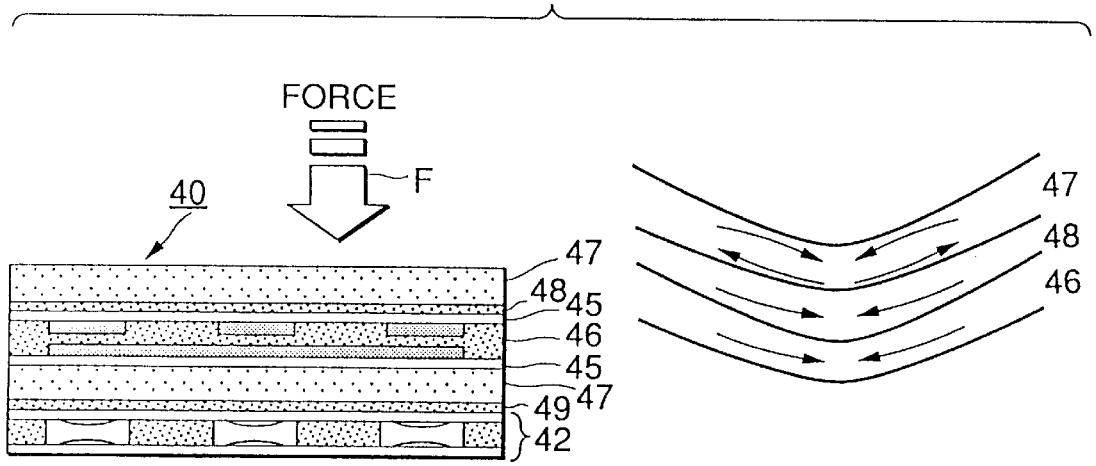
FIG. 10 is a diagram to show how a liquid crystal display panel is deformed.
Figure 11:
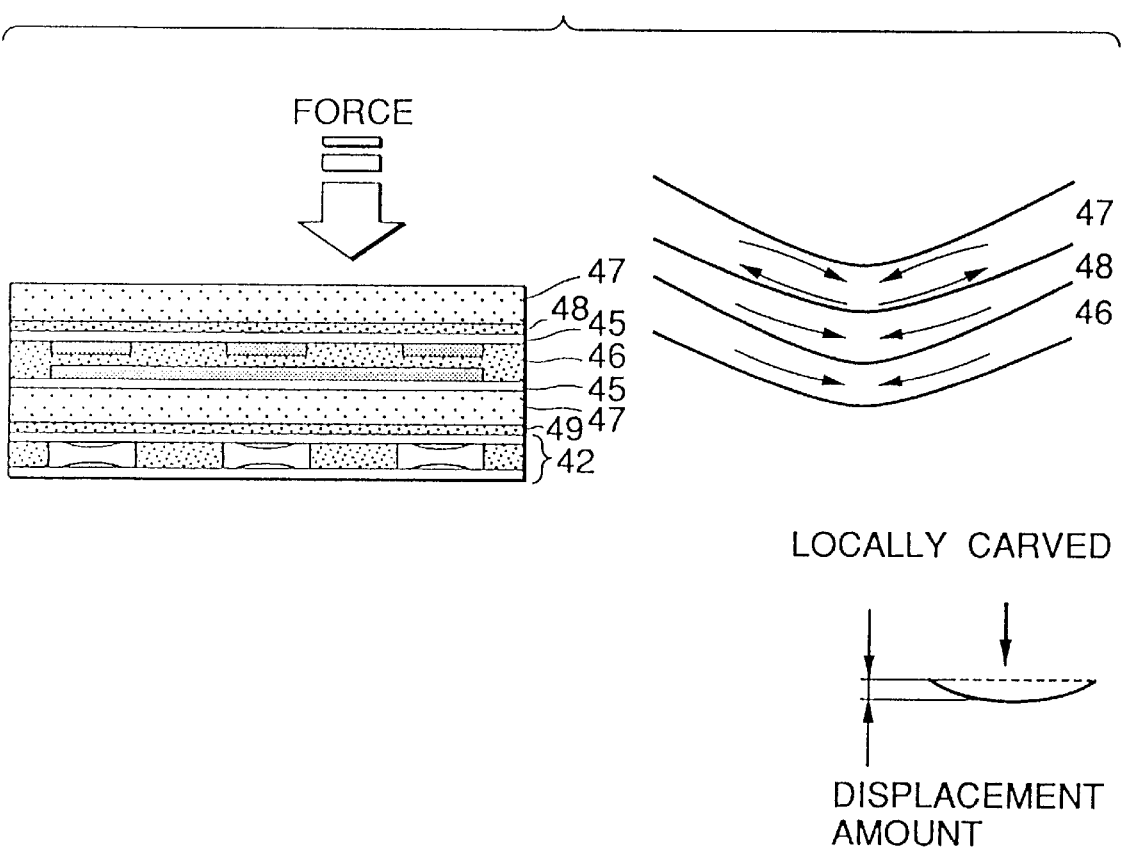
FIG. 11 is a diagram to show how a liquid crystal display panel is deformed.
Figure 12:
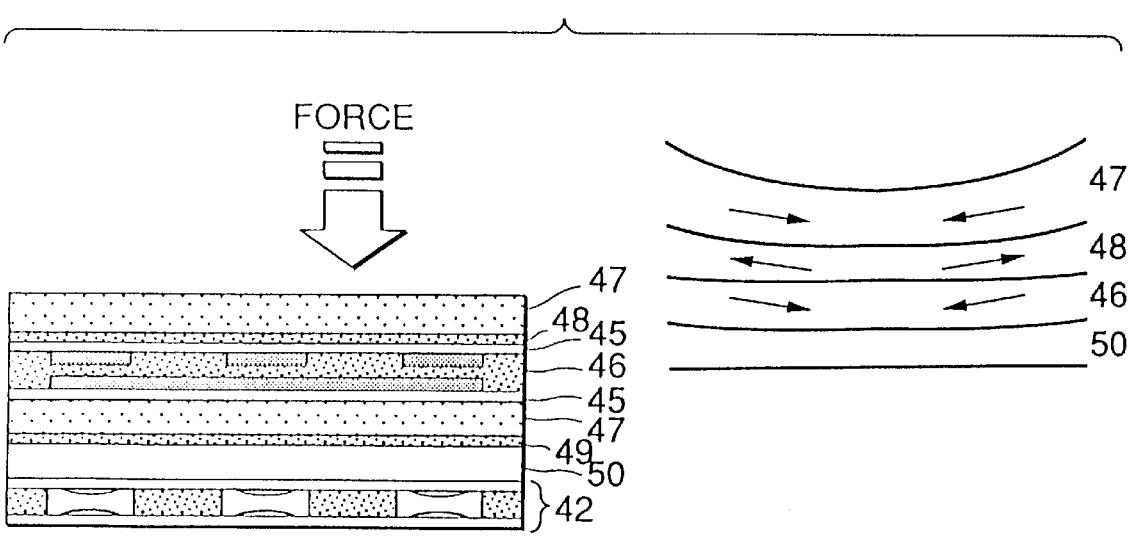
FIG. 12 is a diagram to show how a liquid crystal display panel is deformed.
Figure 13:
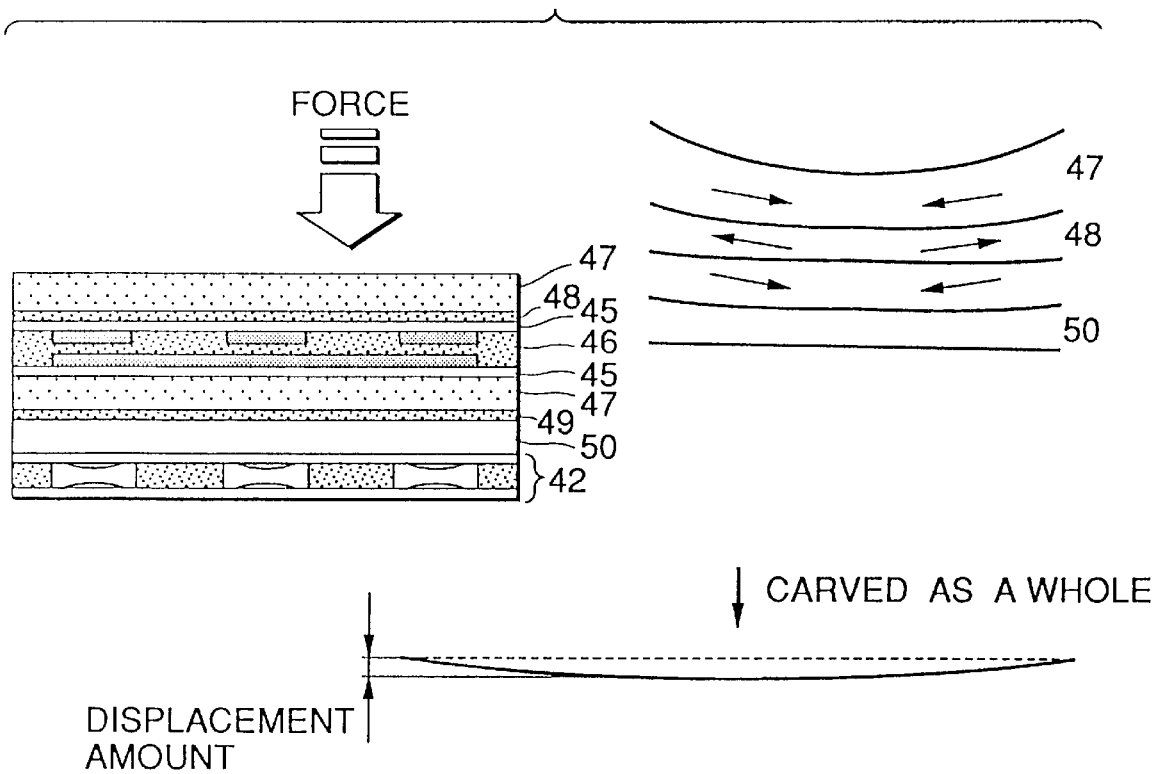
FIG. 13 is a diagram to show how a liquid crystal display panel is deformed.

In a further description, as shown in FIG. 10, if the reinforcing plate 50 is not placed below the liquid crystal display panel 41, namely, if a space or a soft substance is placed below the bendable liquid crystal display panel 41, press pressure F acting on the bendable liquid crystal display panel 41 causes the bendable liquid crystal display panel 41 to largely bend, as shown in FIG. 11, increasing a partial displacement of the liquid crystal 46, so that orientation destruction of the liquid crystal 46 becomes easy to occur. In contrast, if the reinforcing plate 50 is placed below the bendable liquid crystal display panel 41, as shown in FIG. 12, the bendable liquid crystal display panel 41 bends on the whole due to the strength of the reinforcing plate 50 and the displacement amount of the bendable liquid crystal display panel 41 can be lessened accordingly as shown in FIG. 13, so that orientation destruction of the liquid crystal 46 can be reliably prevented from occurring.

From the viewpoint of the resolution of the membrane switches 42 placed below the liquid crystal display panel 41, it is also desirable to place the reinforcing plate 50 is placed below the liquid crystal display panel 41.

Figure 14:
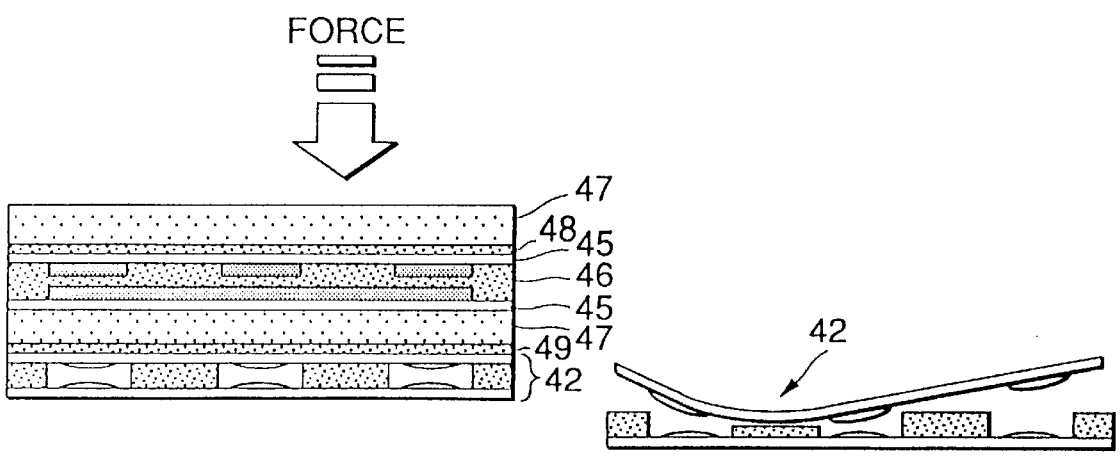
FIG. 14 is a diagram to show how membrane switches are deformed.

That is, the membrane switches 42 placed below the liquid crystal display panel 41 often have switches shaped like circles and often have a coarse switch part density, thus it is feared that the switch resolution will not satisfy specifications. If the reinforcing plate 50 is not placed below the liquid crystal display panel 41, as shown in FIG. 14, when a space between switches is pressed, the switch sheet 52 of the membrane switches 42 largely bends and the distance between the membrane switch sheets 52 above and below the press point is shortened, but the upper and lower switch parts 53 do not come in contact with each other and no conduction occurs, thus resulting in no resolution at this position.

Figure 15:
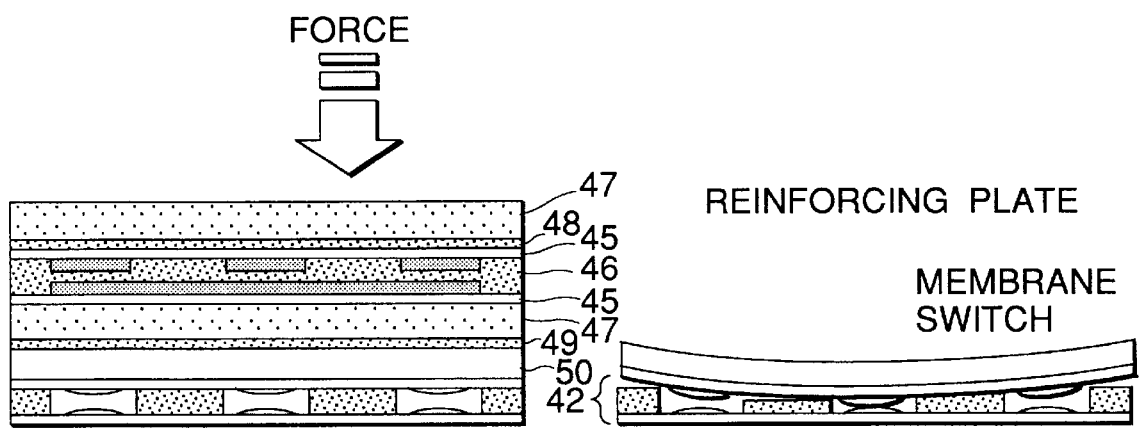
FIG. 15 is a diagram to show how membrane switches are deformed.

On the other hand, if the reinforcing plate 50 is placed below the liquid crystal display panel 41, as shown in FIG. 15, it largely bends, whereby the portion pushed between the sheets 52 of the membrane switches 42 increases in area and the upper and lower switch sheets on both sides of the press point come in contact with each other and switch conduction occurs. Since the switch parts 53 provided on the sheet 52, 52 of the membrane switches 42 come in reliable contact with each other by providing the reinforcing plate 50, it is also desirable to place the reinforcing plate 50 below the liquid crystal display panel 41 to enhance the reliability of input of the membrane switches 42 and the resolution thereof.

Embodiment 3

Figure 16:
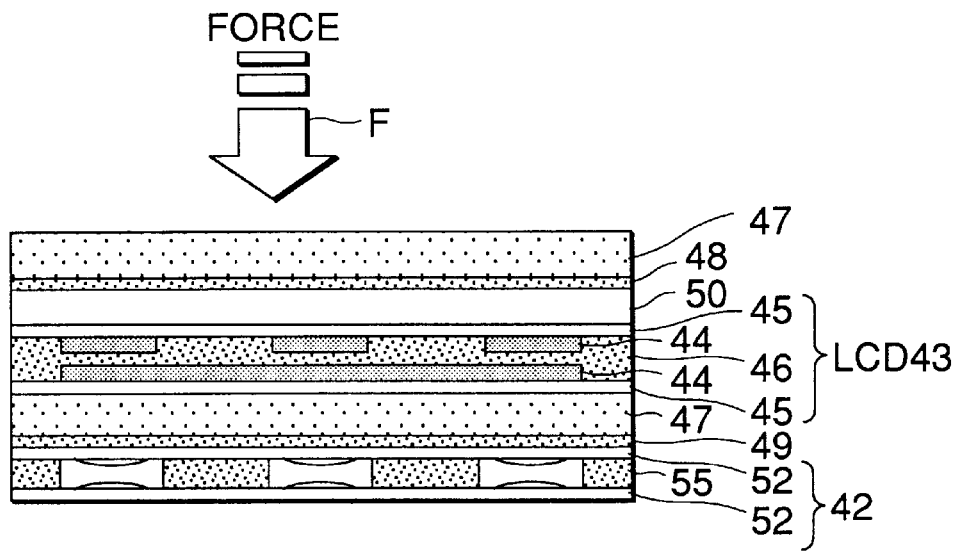
FIG. 16 is a perspective view of the main part to show an input-output unit according to a third embodiment of the invention.

FIG. 16 shows a third embodiment of the invention. Parts identical with those described above in the embodiments are denoted by the same reference numerals. The third embodiment differs from the second embodiment in reinforcing plate position.

That is, in the third embodiment, a reinforcing plate 50 is placed between a PES sheet 45 on the surface side of a liquid crystal display panel 41 and a shock absorption layer 48 made of a viewability enhancement sheet. Membrane switches 42 are directly placed below a reflection plate 49 positioned below the liquid crystal display panel 41.

Figure 17:
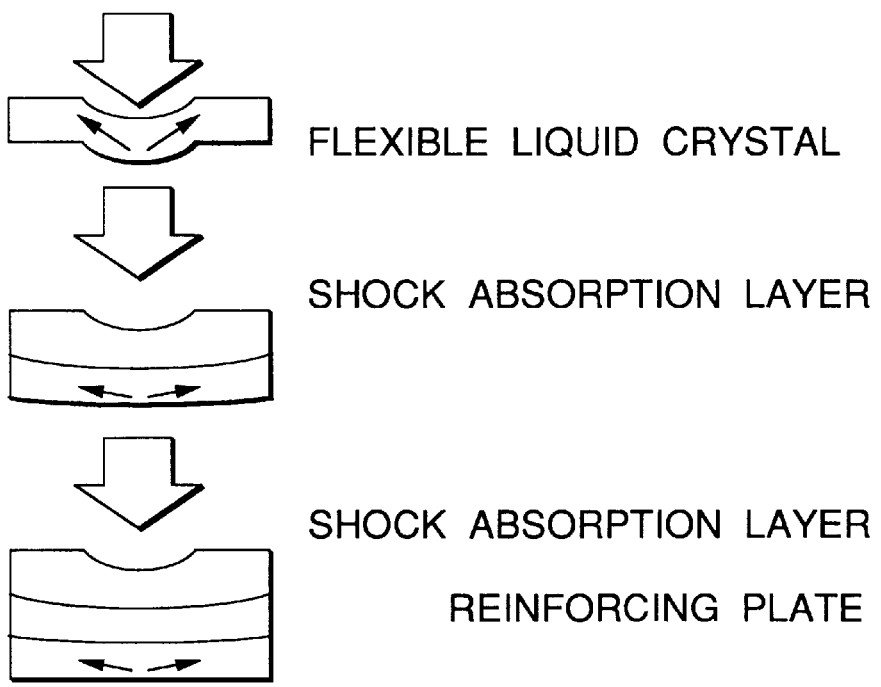
FIG. 17 is a schematic diagram to show how a liquid crystal display panel is deformed.

As seen in FIG. 17, the reinforcing plate 50 positioned below the shock absorption layer 48 is intended to divert pressure applied to the shock absorption layer 48 to the opposite directions, thus produces the same effect if it exists below the shock absorption layer 48 regardless of positioning the reinforcing plate 50 below the liquid crystal display panel 41 or positioning the reinforcing plate 50 just below the shock absorption layer 48 and positioning the liquid crystal display panel 41 below the reinforcing plate 50.

If the reinforcing plate 50 is thus placed between the PES sheet 45 on the top of the liquid crystal display panel 41 and the shock absorption layer 48 made of the viewability enhancement sheet, deformation of the liquid crystal display panel 41 can be prevented effectively.

The third embodiment is the same as the second embodiment in configuration and function other than described here and therefore will not be discussed again.

Embodiment 4

FIG. 17 shows a fourth embodiment of the invention. Parts identical with those described above in the embodiments are denoted by the same reference numerals. In the fourth embodiment, if more than one membrane switch contact point exists, the press position is sensed by calculation.

Figure 18:
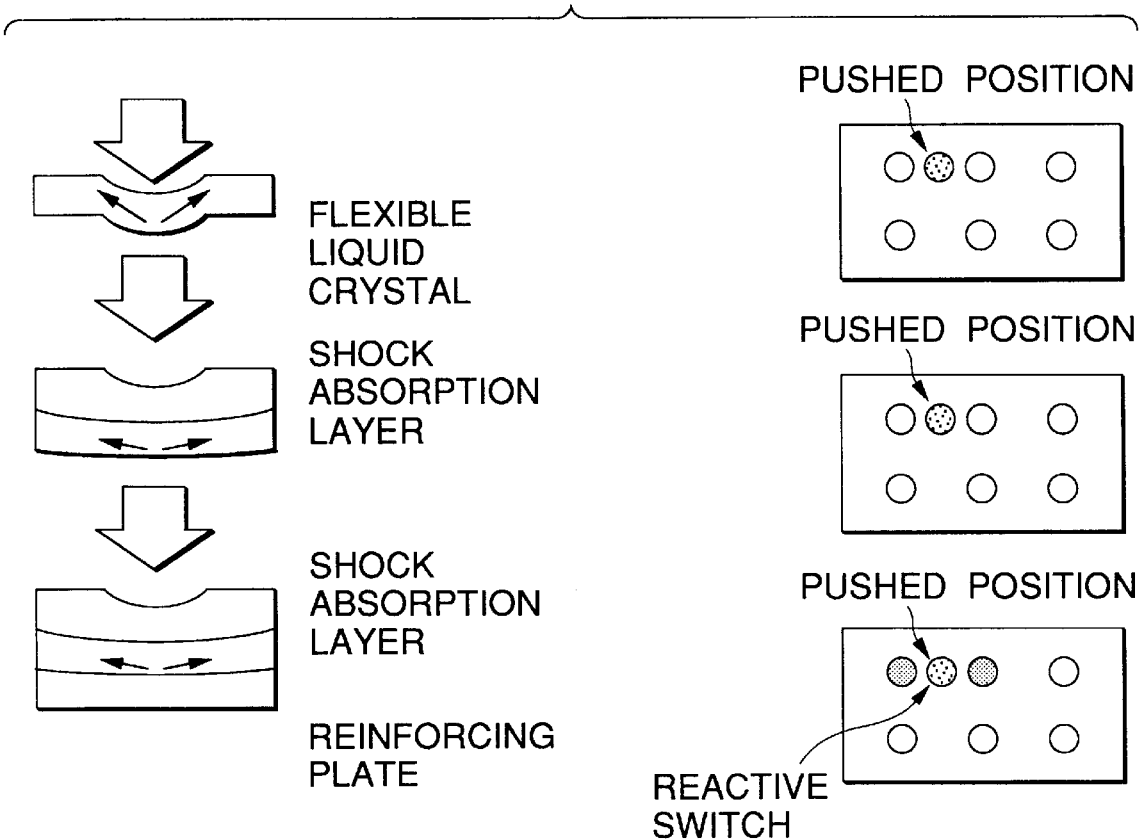
FIG. 18 is a diagram to show an input-output unit according to a fourth embodiment of the invention.

That is, in the fourth embodiment, as shown in FIG. 18, if a shock absorption layer 48 is placed above a bendable liquid crystal display section 43 and a reinforcing layer 50 is placed below the liquid crystal display section 43 or if the shock absorption layer 48 and reinforcing layer 50 are placed above the bendable liquid crystal display section 43, when a position between the adjacent switch parts is pressed, the two adjacent switch parts are turned on at the same time, thus the CPU is adapted to sense pressing the intermediate position between the two adjacent switch parts.

According to the configuration, the half position of a pitch of the switch parts in membrane switches 42 can be sensed and the resolution of the membrane switches 42 can be set to twice the switch placement density by the calculation method.

EXAMPLES

Referring to the accompanying drawings, there are shown input-output units according to examples of the invention.

Example 1

FIG. 5 also shows an input-output unit according to a first example of the invention. Parts identical with those previously described in the second embodiment are denoted by the same reference numerals.

For example, a PES sheet 45 0.1 mm thick is laminated on both the surface and rear face of ferroelectric liquid crystal 46 (containing ITO electrodes 44) 2.5 μm thick to provide a liquid crystal display section 43 of a liquid crystal display panel 41 in an input-output unit 40. For example, linear ITO electrodes 45 each 0.27 mm wide are formed on the PES sheets 45 at 0.3-mm pitches. For example, a viewability enhancement sheet 400 μm thick manufactured by Nitto Denko is used as a viewability enhancement sheet 48 placed on the surface side of the liquid crystal display panel 41. Further, for example, a polarizing plate 0.4 mm thick is used as a polarizing plate placed on both the surface and rear face of the liquid crystal display section 43 of the liquid crystal display panel 41.

For example, aluminum foil 0.1–0.2 mm thick is bonded to the rear face of the polarizing plate 47 as a reflection plate 49 placed below the polarizing plate 47 on the rear face of the liquid crystal display section 43. Further, for example, an acrylic plate 0.4 mm thick is used as a reinforcing plate 50 placed below the reflection plate 49.

Example 2

FIG. 16 also shows a second example of the invention. Parts identical with those previously described in the first example are denoted by the same reference numerals. The second example differs from the first example in reinforcing plate position as the third embodiment differs from the second embodiment.

That is, in an input-output unit 40 according to the second example, a reinforcing plate 50 made of an acrylic plate 0.4 mm thick is placed between a PES sheet 45 on the top of a liquid crystal display panel 41 and a shock absorption layer 48 made of a viewability enhancement sheet, for example, as shown in FIG. 16.

The second example is the same as the first example in configuration and function other than described here and therefore will not be discussed again.

Example 3

Figure 22:
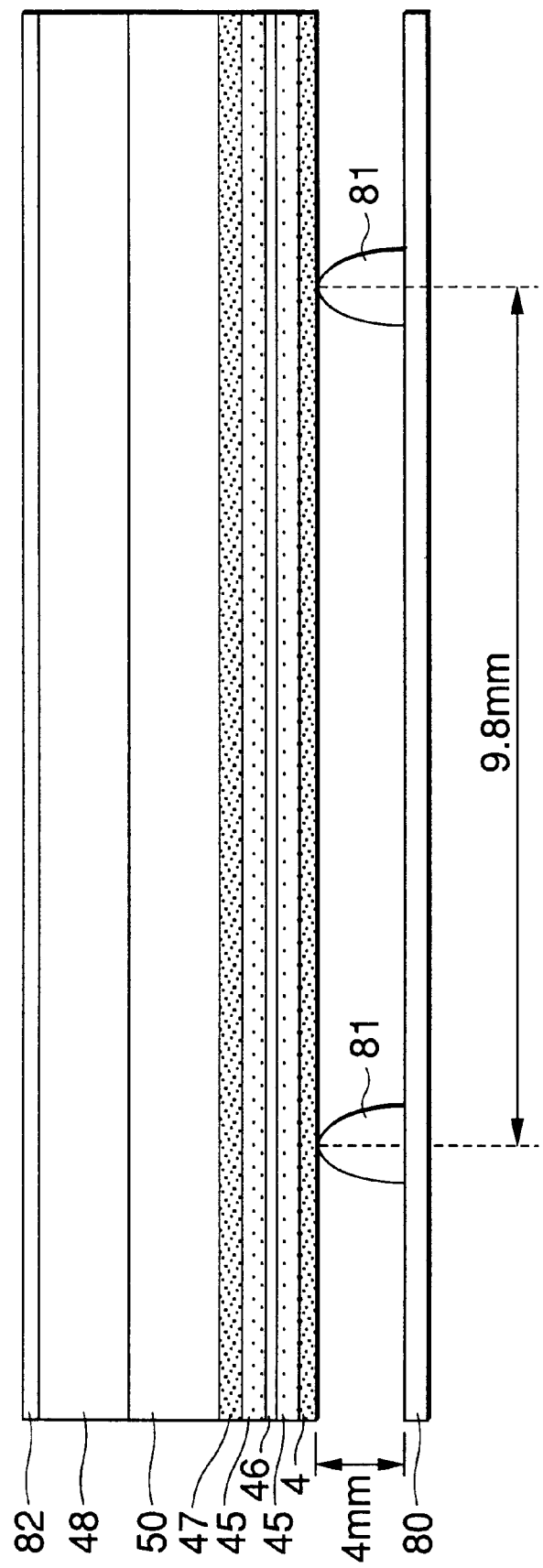
FIG. 22 is a sectional view to show an input-output unit according to a third example of the invention.

FIG. 22 also shows a third example of the invention. Parts identical with those previously described in the first example are denoted by the same reference numerals. In the third example, a sheet 80 formed with projections in a given spacing is inserted between a liquid crystal display panel 41 and membrane switches 42 to enhance the resolution of the membrane switches.

That is, as shown in FIG. 22, an input-output unit according to the third example comprises lamination of a thin protective film 82, a viewability enhancement sheet 48 0.4 mm thick a reinforcing plate 50 made of an acrylic plate 0.4 mm thick, a polarizing plate 47 made of polyester 0.1 mm thick, a PES sheet 45 0.1 mm thick, gel ferroelectric liquid crystal 46 2.5 μm thick (containing ITO electrodes 44), a PES sheet 45 0.1 mm thick, and a polarizing plate 47 made of polyester 0.1 mm thick from the view side to rear side, forming a liquid crystal display panel 41. The sheet 80 formed with projections 81 0.4 mm high at 9.8-mm pitches is placed below the liquid crystal display panel 41. The pitches of the projections 81 of the sheet 80 are set so as to match the switch part 53 spacing of membrane switches 42.

The sheet 80 formed with the projections 81 in a given spacing is thus placed below the liquid crystal display panel 41, whereby press pressure applied from the view side of the liquid crystal display panel 41 acts concentratedly on the membrane switch 42, so that the resolution of the membrane switches 42 can be enhanced.

The third example is the same as the first example in configuration and function other than described here and therefore will not be discussed again.

Example 4

Figure 23:
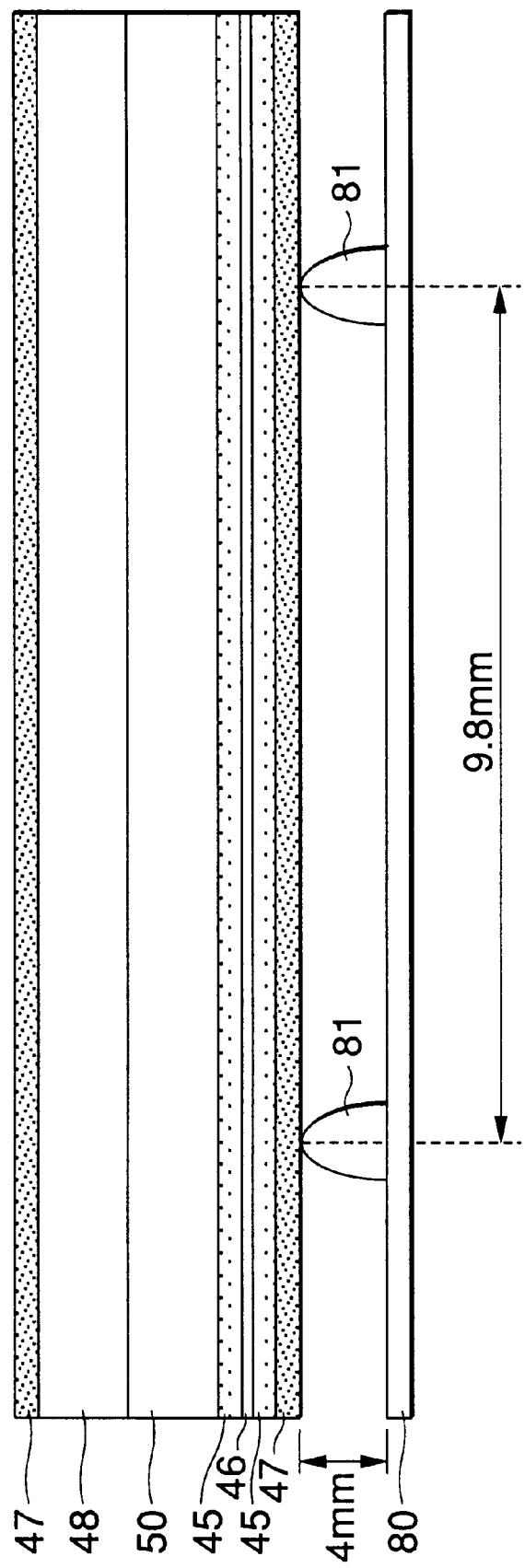
FIG. 23 is a sectional view to show an input-output unit according to a fourth example of the invention.
Figure 24:
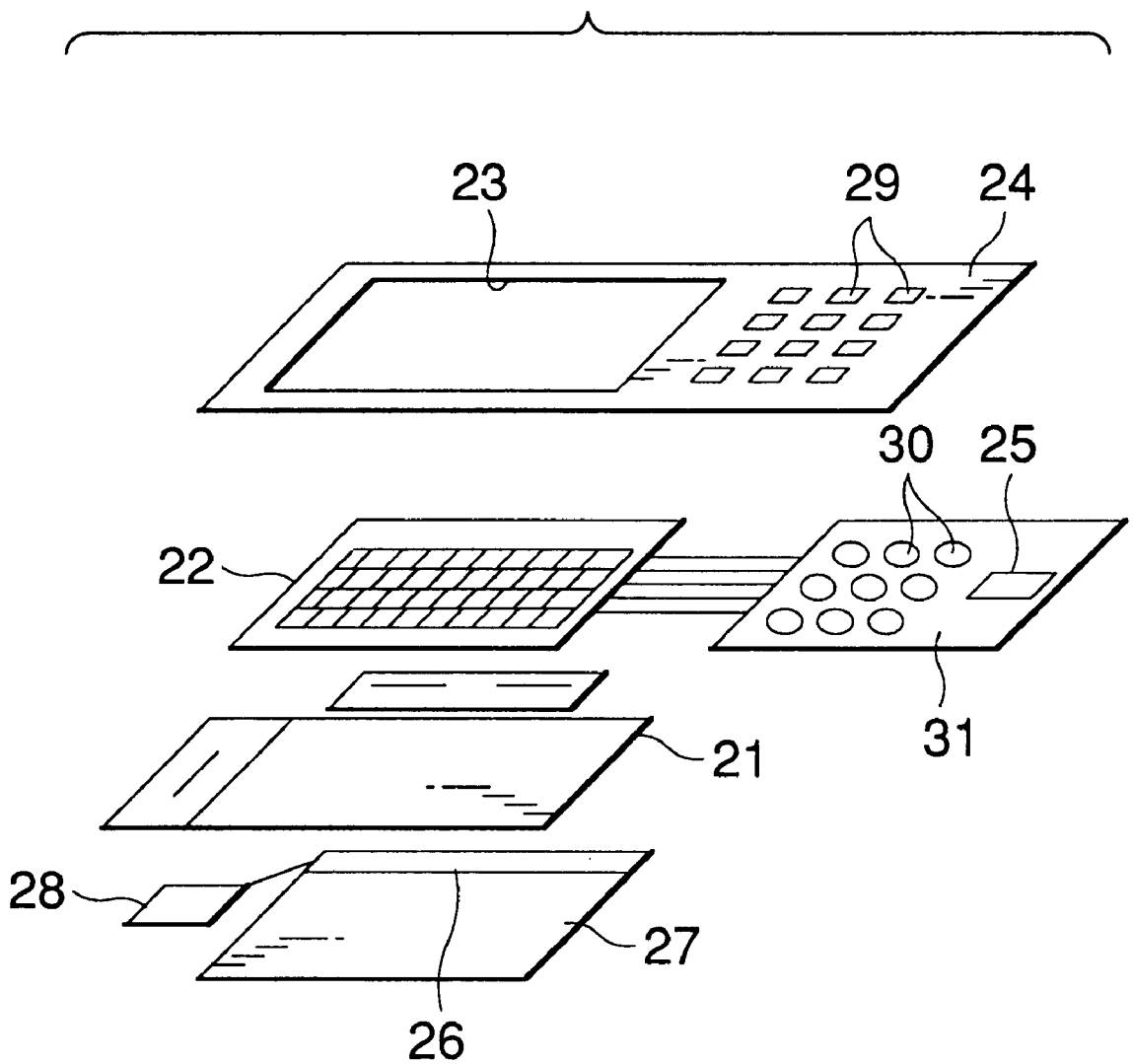
FIG. 24 is an exploded perspective view to show an example of a conventional control panel.

FIG. 23 also shows a fourth example of the invention. Parts identical with those previously described in the first example are denoted by the same reference numerals. In the fourth embodiment like the third example, a sheet 80 formed with projections in a given spacing is inserted between a liquid crystal display panel 41 and membrane switches 42 to enhance the resolution of the membrane switches, but the fourth embodiment differs from the third embodiment in lamination state of the liquid crystal display panel 41.

That is, as shown in FIG. 23, an input-output unit according to the fourth example comprises lamination of a polarizing plate 47 made of polyester 0.1 mm thick, a viewability enhancement sheet 48 0.4 mm thick, a reinforcing plate 50 made of an acrylic plate 0.4 mm thick, a PES sheet 45 0.1 mm thick, gel ferroelectric liquid crystal 46 2.5 μm thick (containing ITO electrodes 44), a PES sheet 45 0.1 mm thick, and a polarizing plate 47 made of polyester 0.1 mm thick from the view side to rear side, forming a liquid crystal display panel 41. The sheet 80 formed with projections 81 0.4 mm high at 9.8-mm pitches is placed below the liquid crystal display panel 41. The pitches of the projections 81 of the sheet 80 are set 80 as to match the switch part 53 spacing of membrane switches 41.

The sheet 80 formed with the projections 81 in a given spacing is thus placed below the liquid crystal display panel 41, whereby press pressure applied from the view side of the liquid crystal display panel 41 acts concentratedly on the membrane switch 41, so that the resolution of the membrane switches 41 can be enhanced.

The fourth example is the same as the first example in configuration and function other than described here and therefore will not be discussed again.

EXPERIMENTAL EXAMPLES

Experimental Example 1

Figure 19:
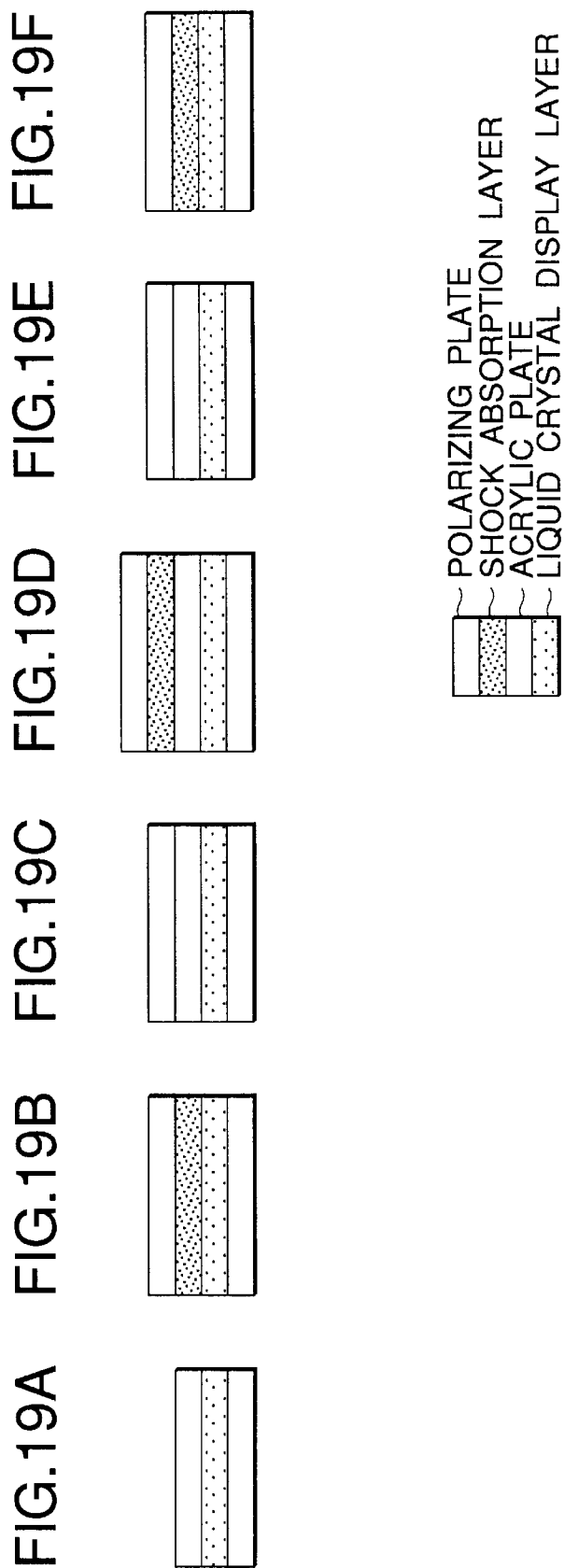
FIGS. 19A to 19F are schematic diagrams to show experimental and control examples.

Next, the inventor et al. used the same materials as those shown in the first example to prototype an input-output unit 40 comprising a polarizing plate 47, a shock absorption layer 48 made of a gel resin, a liquid crystal display section 43, a polarizing plate 47, and membrane switches (not shown) laminated in order from the surface side to the rear side, as shown in FIG. 19B, and carried out an experiment for checking how the action of press pressure F changes if the thickness of a spacer of the membrane switches 42 is changed to 0.04 mm and 0.1 mm and the magnitude of the press pressure F pressing the surface of the input-output unit 40 is changed variously.

Figure 20:
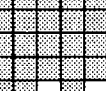
FIG. 20 is a chart to show the results of pressure sensitive tests of the samples shown in FIGS. 19A to 19F.

LCD No. 2 in FIG. 20 shows the experimental results of the first experimental example.

Experimental Example 2

Next, the inventor et al. used the same materials as those shown in the first example to prototype an input-output unit 40 comprising a reinforcing plate 50 made of an acrylic plate, a polarizing plate 47, a liquid crystal display section 43, a polarizing plate 47, and membrane switches (not shown) laminated in order from the surface side to the rear side, as shown in FIG. 19C, and carried out an experiment for checking how the action of press pressure F changes if the magnitude of the press pressure F pressing the surface of the input-output unit 40 is changed variously.

LCD No. 3 in FIG. 20 shows the experimental results of the second experimental example.

Experimental Example 3

Next, the inventor et al. used the same materials as those shown in the first example to prototype an input-output unit 40 comprising a reinforcing plate 50 made of an acrylic plate, a polarizing plate 47, a liquid crystal display section 43, a polarizing plate 47, and membrane switches (not shown) laminated in order from the surface side to the rear side, as shown in FIG. 19D, and carried out an experiment for checking how the action of press pressure F changes if the magnitude of the press pressure F pressing the surface of the input-output unit 40 is changed variously.

LCD No. 4 in FIG. 20 shows the experimental results of the third experimental example.

Experimental Example 4

Further, the inventor et al. used the same materials as those shown in the first example to prototype an input-output unit 40 comprising a polarizing plate 47, an acrylic plate as a reinforcing plate 50, a liquid crystal display section 43, a polarizing plate 47, and membrane switches (not shown) laminated in order from the surface side to the rear side, as shown in FIG. 19E, and carried out an experiment for checking how the action of press pressure changes.

LCD No. 5 in FIG. 20 shows the experimental results of the fourth experimental example.

Experimental Example 5

Further, the inventor et al. used the same materials as those shown in the first example to prototype an input-output unit 40 comprising a polarizing plate 47, a shock absorption layer 48 made of a material harder than the shock absorption layer 48 of the first experimental example, a liquid crystal display section 43, a polarizing plate 47, and membrane switches (not shown) laminated in order from the surface side to the rear side, as shown in FIG. 19F, and carried out an experiment for checking how the action of press pressure changes.

LCD No. 6 in FIG. 20 shows the experimental results of the fourth experimental example.

COMPARATIVE EXAMPLE

Comparative Example 1

The inventor et al. used the same materials as those shown in the first example to prototype an input-output unit 40 comprising a polarizing plate 47, a liquid crystal display section 43, a polarizing plate 47, and membrane switches (not shown) laminated in order from the surface side to the rear side, as shown in FIG. 19A, and carried out an experiment for checking how the action of press pressure changes.

Figure 21:
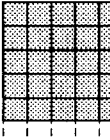
FIG. 21 is a chart to show the results of pressure sensitive tests of the samples shown in FIGS. 19A to 19F.

LCD No. 1 in FIG. 20 and LCD No. 1 in FIG. 21 show the experimental results of the first compartive example.

As seen in LCD Nos. 1 to 6 in FIG. 20 and 21, the input-output units 40 of the second and fourth experimental examples are somewhat poor in reactivity of the membrane switches 42, but do not markedly differ. The input-output unit 40 of the first comparative example is good in reactivity of the membrane switches 42, but orientation destruction occurs in the liquid crystal display section 43 because of press pressure.

As we have discussed in detail, acccording to the invention, the detection means is provided below the display screen, whereby the display unit and the input unit are formed in one piece, thus if the user presses the view side of the display screen with a finger or a pen in response to the display contents of the display screen (for example, virtual buttons), the detection means can detect the press position on the display screen for input, providing very good operability. For example, if the detection unit is within the display area of the virtual buttons, the input operation of pressing the virtual button is performed. Further, the detection means of the input unit is provided below the display screen, so that a display obstacle such as a touch panel does not exist on the display screen. Thus, very good viewability is provided, and no back-light, etc., is required with the results that the display unit can be made simple in structure and inexpensive. In addition, unlike the touch panel on the display screen, the detection means need not be made transparent. The material and manufacturing method are less limited as compared with the touch panel on the display screen, thus an input-output can be manufactured at very low costs. If sheet-like devices are used as the display screen and the detection means therebelow, they can be made light and provide good space efficiency, thus can be applied to portable electronic machines. If the input-output unit to which the invention is applied is applied to electronic machines, the electronic machines can be made light.

According to the input-output unit of the invention, the information input display provided in the control panel comprises a flexible sheet information display screen superposed on the switch matrix board, thus good viewability is operation information and virtual operation buttons displayed on the information display screen is provided and it is not feared that the display may be broken under press pressure when the virtual operation button is operated, and moreover the number of components can be decreased, thus the input-output unit can be manufactured at low costs.

As seen from the description made so far, if the user presses the liquid crystal display panel to enter information, the liquid crystal orientation is not destroyed and an input-output having good display quality as a panel can be provided.

In the structure wherein the switches are placed below the liquid crystal display panel, the resolution of the switches is enhanced and an input-output unit with inexpensive liquid crystal display can be provided.

Further, in the invention, there can be provided an input-output unit that can reliably prevent liquid crystal orientation destruction, etc., caused when a liquid crystal display panel is pressed, and can also reliably perform the operation of switch devices, etc., if the liquid crystal display panel is placed on the top of the switch devices, etc., for making the liquid crystal display panel easy to see and providing excellent viewability of images displayed on the liquid crystal display panel.

Furthermore, with use of the shock absorption layer and the reinforcing layer, the viewability is improved, and the protection of the display unit from an external force, and the certainty of input can be increased.

What is claimed is:

1. An input-output unit, comprising:
    a display unit having a bendable display screen for displaying information on said bendable display screen, the display screen having a view side and a layer at the view side of the display screen;
    a pressure-sensitive input unit containing detection means being provided below the display screen for detecting a position on said bendable display screen in response to press pressure from a view side of said bendable display screen; and
    a shock absorption layer having an elasticity that disperses a local stress from the view side of said display screen on the layer at the view side of the display screen and transferring the dispersed stress to said detection means.

2. The input-output unit as claimed in claim 1, wherein said bendable display screen and said detection means therebelow are shaped as a sheet.

3. The input-output unit as claimed in claim 1, wherein said display screen contains any of a liquid crystal display panel, an electroluminescence panel, or a twisting ball panel display.

4. An input-output unit, comprising:
    an information input display for displaying various pieces of operation information of an electronic machine and virtual operation buttons corresponding to the operation information on a display screen and enabling a user to enter control information of the electronic machine by pressing the virtual operation buttons, said information input display comprising:
    a switch matrix board;
    a plurality of input switches placed on said switch matrix board at predetermined pitches;
    a flexible information display screen superposed on said switch matrix board, the flexible information display screen being shaped as a sheet and having a view side and a layer at the view side of the information display screen; and
    a shock absorption layer having an elasticity that disperses a local stress from a view side of said information display screen on the layer at the view side of the information display screen and transferring the dispersed stress to said switches.

5. The input-output unit as claimed in claim 4 wherein said information display screen comprises a reflection-type liquid crystal panel.

6. The input-output unit as claimed in claim 4 wherein said switch matrix board comprises a membrane board.

7. The input-output unit as claimed in claim 4 wherein said input switches comprise pressure-sensitive switches.

8. An input-output unit, comprising:
    a bendable image display panel having an image display device, a view side and a layer at the view side of the image display panel;
    means being laminated below said image display panel for sensing coordinates of a position pressed from the view side of said image display panel; and
    a shock absorption layer having elasticity that disperses a local stress from the view side of said image display panel on the layer at the view side of the image display panel and transferring the dispersed stress to said coordinate sensing means.

9. The input-output unit as claimed in claim 8 wherein said image display panel is formed of a bendable liquid crystal display panel including a liquid crystal display device, and said coordinate sensing means detects the coordinates of a position of the liquid crystal display panel which is pushed from a view side thereof.

10. The input-output unit as claimed in claim 8, wherein said liquid crystal display panel includes a pair of polarizing plates at a position where the liquid crystal display device is interposed between said polarizing plates, and the shock absorption layer having flexibility is placed between the liquid crystal display device and a polarizing plate positioned on the view side of the liquid crystal display device and wherein a refractive index of the shock absorption layer is set to a value closer to a refractive index of material forming the liquid crystal display device and the polarizing plate than a refractive index of air.

11. The input-output unit as claimed in claim 8 wherein said liquid crystal display panel includes a pair of polarizing plates at a position where the liquid crystal display device is interposed between said polarizing plates, and the shock absorption layer having flexibility is placed between the liquid crystal display device and a polarizing plate positioned on the view side of the liquid crystal display device and a reinforcing plate for protecting the liquid crystal display device is placed below the shock absorption layer.

12. The input-output unit as claimed in claim 11 wherein the shock absorption layer having flexibility is placed between the liquid crystal display device and a polarizing plate positioned on the view side of the liquid crystal display device and a reinforcing plate for protecting the liquid crystal display device and widening a range in which said coordinate sensing means receives pressure is placed below the liquid crystal display device.

13. The input-output unit as claimed in claim 12 wherein elastic moduli of the shock absorption layer, the liquid crystal display device, and the reinforcing plate are set so as to satisfy relation of reinforcing plate>liquid crystal display device>shock absorption layer.

14. The input-output unit as claimed in claim 8 wherein the shock absorption layer is made of a gel resin material or a rubber resin material.

15. The input-output unit as claimed in claim 8 wherein said coordinate sensing means is made of membrane switches.

* * * * *